(12) United States Patent
Bhardwaj et al.

(10) Patent No.: US 8,504,978 B1
(45) Date of Patent: Aug. 6, 2013

(54) USER INTERFACE FOR TIMING BUDGET ANALYSIS OF INTEGRATED CIRCUIT DESIGNS

(75) Inventors: Vivek Bhardwaj, New Delhi (IN); Didier Seropian, Anbibes (FR); Oleg Levitsky, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 224 days.

(21) Appl. No.: 12/437,096

(22) Filed: May 7, 2009

Related U.S. Application Data

(60) Provisional application No. 61/164,860, filed on Mar. 30, 2009.

(51) Int. Cl.
*G06F 15/04* (2006.01)
*G06F 17/50* (2006.01)

(52) U.S. Cl.
USPC ........... 716/139; 716/106; 716/108; 716/111; 716/134; 716/113

(58) Field of Classification Search
USPC .......................... 716/108, 111, 113, 134, 139
See application file for complete search history.

(56) References Cited

U.S. PATENT DOCUMENTS

| | | | |
|---|---|---|---|
| 5,475,607 A | 12/1995 | Apte et al. | |
| 6,099,584 A | 8/2000 | Arnold et al. | |
| 6,324,678 B1 | 11/2001 | Dangelo et al. | |
| 6,578,183 B2 | 6/2003 | Cheong et al. | |
| 6,651,235 B2 | 11/2003 | Dai et al. | |
| 6,678,644 B1 | 1/2004 | Segal | |
| 6,817,005 B2 | 11/2004 | Mason et al. | |
| 7,143,367 B2 | 11/2006 | Eng | |
| 7,467,367 B1 | 12/2008 | Li et al. | |
| 7,926,011 B1 | 4/2011 | Levitsky et al. | |
| 2004/0003360 A1 | 1/2004 | Batchelor et al. | |
| 2005/0268269 A1* | 12/2005 | Coiley | 716/11 |
| 2006/0053396 A1* | 3/2006 | Eng | 716/7 |
| 2009/0271750 A1 | 10/2009 | Richardson et al. | |

OTHER PUBLICATIONS

Rossoshek, Y. Office Action for U.S Appl. No. 11/621,915. Apr. 8, 2009. pp. 1-13.

* cited by examiner

*Primary Examiner* — Vuthe Siek
*Assistant Examiner* — Brian Ngo
(74) *Attorney, Agent, or Firm* — Alford Law Group, Inc.

(57) ABSTRACT

In one embodiment of the invention, a method includes reading an automatically generated timing budgeting file, including timing budget information for a plurality of partitions of an integrated circuit design; graphically displaying a time budgeting debug window on a display device; and graphically displaying a timing budget analyzer window on the display device in response to selection of a selected signal path in a path list window pane. The timing budget analyzer window graphically displays timing budgets and timing delays of a selected path for visual comparison. The time budgeting debug window includes a button with a path category menu to display one or more signal paths meeting a selected path category, and a path list window pane to display a list of one or more signal paths through one or more ports of the plurality of partitions in response to the selected path category in the path category menu.

29 Claims, 9 Drawing Sheets

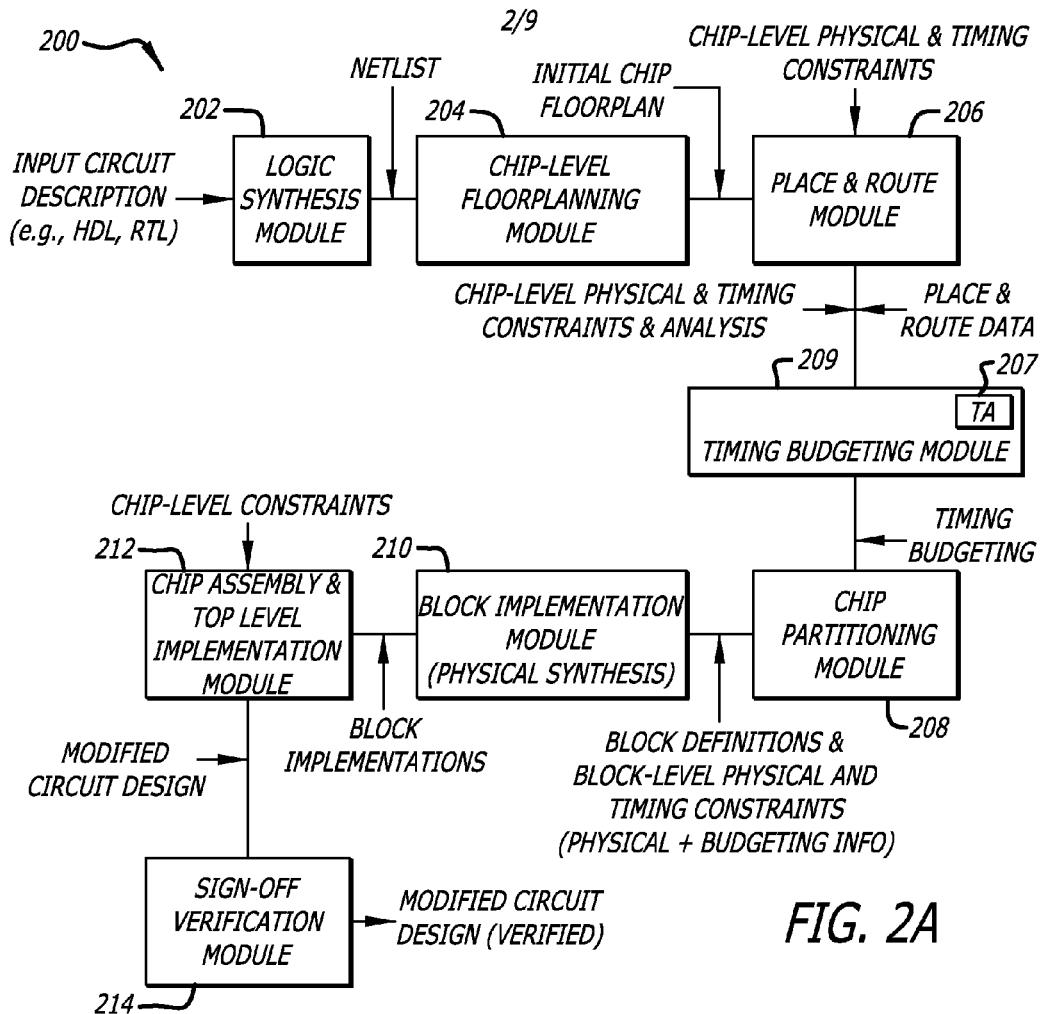
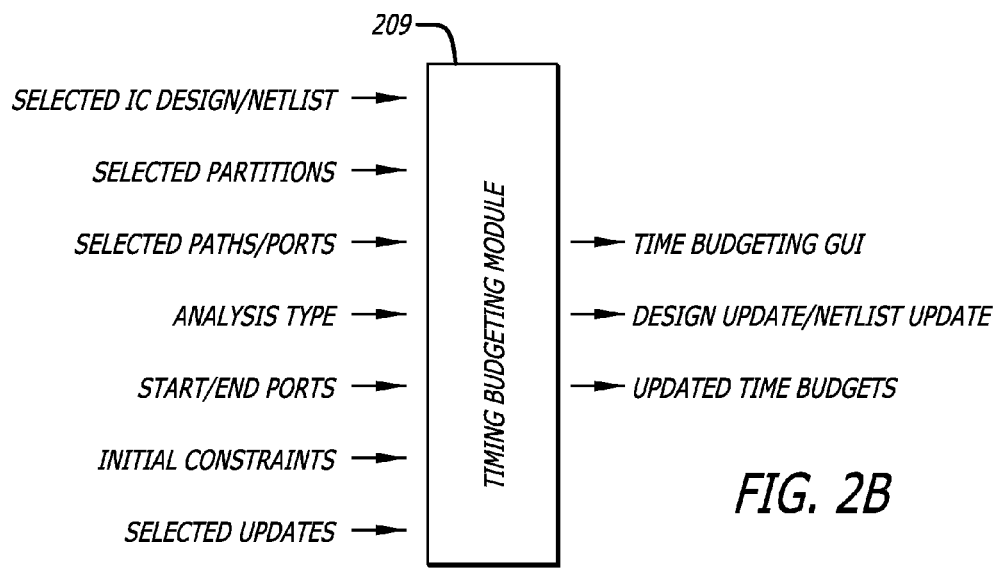
FIG. 2A
FIG. 2B

USER INTERFACE FOR TIMING BUDGET ANALYSIS OF INTEGRATED CIRCUIT DESIGNS

CROSS-REFERENCE TO RELATED APPLICATIONS

"This non-provisional United States (U.S.) patent application claims the benefit of U.S. Provisional Patent Application No. 61/164,860 entitled USER INTERFACE FOR TIMING BUDGET ANALYSIS OF INTEGRATED CIRCUIT DESIGNS filed on Mar. 30, 2009 by inventors Vivek Bhardwaj et al.

FIELD OF THE INVENTION

This invention relates to user interfaces for evaluating timing constraints of integrated circuit designs.

BACKGROUND OF THE INVENTION

Integrated circuits have become larger and more complex to provide additional functionality and/or improved performance. The task of designing these integrated circuits is also very complex and time consuming, involving synthesizing, analyzing and optimizing many circuit parameters. Because of this complexity, electronic design automation (EDA) systems have been developed to assist designers in developing integrated circuit designs at multitude levels of abstraction.

To ease the design of a complex integrated circuit, design tasks may be divided up into multiple functional blocks with a plurality of levels of hierarchy. However, dividing up an integrated circuit design into multiple blocks and hierarchical levels can complicate the evaluation of the overall circuit design. Moreover an integrated circuit design may be so large in size (e.g., 20-30 million gates), each partition may have numerous signal paths (e.g., hundreds of thousands of signal paths for data, address, control, and clock signals) and numerous input, output, or input/output ports (e.g., thousands of ports).

Timing budgets for signal paths are usually automatically generated in early design stages when the integrated circuit design may be incomplete or have errors so that generated timing budgets may require manual correction and analysis. The process of automatic timing budgeting usually generates much time budgeting data so that the quality of the generated timing budgets may be analyzed. However, this time budgeting data is usually represented by one or more simple text files that have large file sizes (e.g., gigabyte size), making it difficult to timely analyze. Moreover if a user changes one block constraint, it is often very difficult to propagate changes to other blocks of the integrated circuit design using text files.

Thus, there is a need for an apparatus, systems, and methods to better evaluate the quality of time budget results for hierarchical integrated circuit designs and readily make corrections thereto so that goals of an integrated circuit design may be timely met.

SUMMARY OF THE INVENTION

While a summary of the invention is provided here, the embodiments of the invention are best summarized by the claims that follow below.

A timing budgeting process for designing an integrated circuit is disclosed that provides a timing budget graphical user interface (GUI). The timing budget graphical user interface (GUI) may include one or more windows of information that is graphically displayed to a user. Generally for one or more selected paths (which may be automatically selected by a path category), the timing budgeting GUI graphically displays timing delay calculations (e.g., slack calculations) with a color coded cumulative histogram of rectangles and lines next to hierarchy information and a color coded cumulative histogram of timing budget information allocated to the hierarchy of the integrated circuit design, so that a visual comparison may be readily made. If the graphical objects of the timing budgeting GUI indicate that the timing delays are over budget, the timing budgets may be adjusted and/or the integrated circuit redesigned so that the timing delays better meet the timing budgets of the integrated circuit design. In either case with a better integrated circuit design, the semiconductor manufacturing of the integrated circuit may be improved.

BRIEF DESCRIPTION OF THE DRAWINGS

FIG. 2A illustrates a block diagram of exemplary software modules used in an exemplary integrated design system.

FIG. 2B illustrates a block diagram of an exemplary timing budgeting software module used in the exemplary integrated design system.

DETAILED DESCRIPTION OF THE EXEMPLARY EMBODIMENTS

Figure 1:
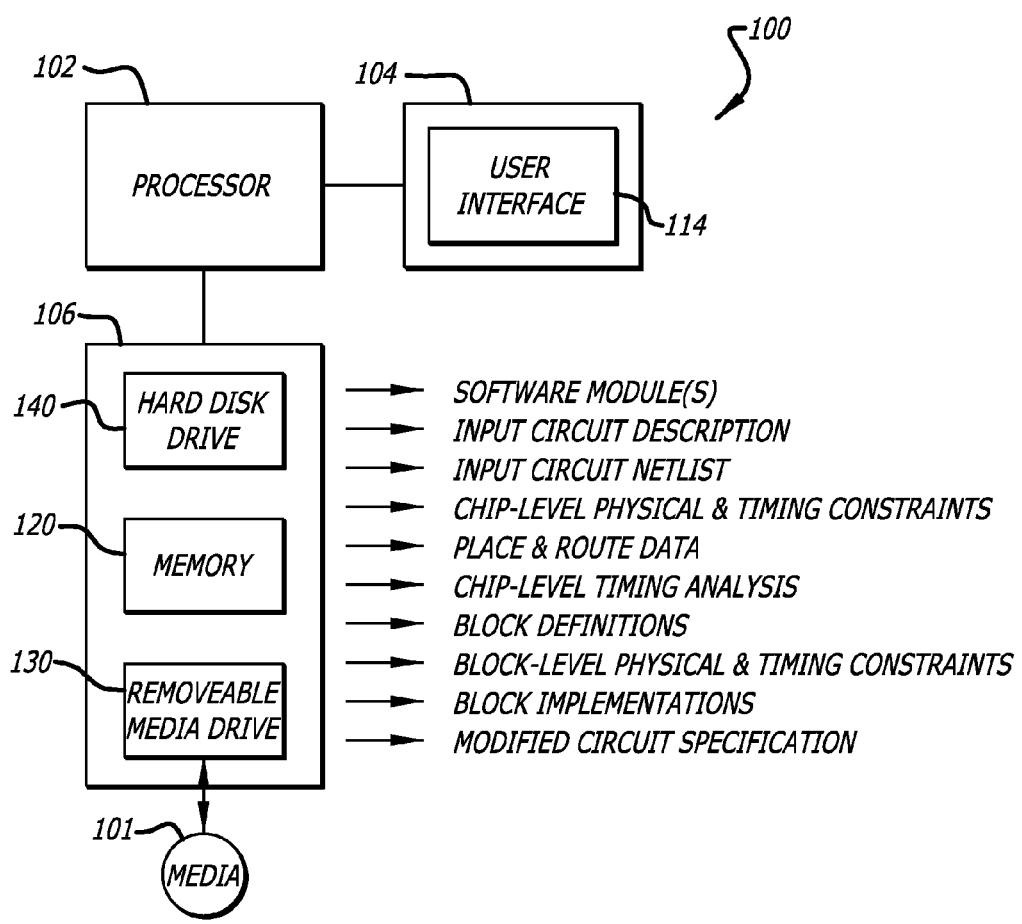
FIG. 1 illustrates a block diagram of an exemplary system for designing integrated circuits including a timing analysis graphical user interface (GUI).

In the following detailed description of the embodiments of the invention, numerous specific details are set forth in order to provide a thorough understanding of the present invention. However, it will be obvious to one skilled in the art that the embodiments of the invention may be practiced without these specific details. In other instances well known methods, procedures, components, and circuits have not been described in detail so as not to unnecessarily obscure aspects of the embodiments of the invention.

Introduction

The embodiments of the invention facilitate budgeting of signal timing between functional blocks or modules of an integrated circuit design which may be referred to as timing budgeting. U.S. patent application Ser. No. 11/621,915, entitled SYSTEM AND METHOD OF GENERATING HIERARCHICAL BLOCK-LEVEL TIMING CONSTRAINTS FROM CHIP-LEVEL TIMING CONSTRAINTS filed by Levitsky et al. on Jan. 10, 2007, hereby incorporated by reference, describes embodiments that generate block-level timing constraints for each block-level circuit that may be used to budget timing within an integrated circuit design to functional modules or blocks as part of the timing budgeting process. Timing budgeting allows partitioning an integrated circuit design into separate blocks or modules (partitions) and performing a stand alone optimization of each based on the generated constraints, including timing constraints. Timing budgeting is a part of the block implementation/design in the IC design flow or sequence that allows generating timing and physical constraints for each partition (e.g., module, block, etc.) of an integrated circuit design, prior to completing the physical design.

The embodiments of the invention allow IC designers to check the generated constraints and do incremental changes if needed during the timing budget generation process. A relatively accurate timing budget is desirable for very large integrated circuit designs at the early stages of the IC design cycle to reduce the time to market on new integrated circuit (also referred to as a chip) designs.

The embodiments of the invention allow analyzing timing budgeting results using a timing budgeting graphical user interface (GUI). The timing budgeting GUI also allows a user to make incremental changes to the timing budgeting data that may then be propagated to the timing budgeting data of other modules and blocks in the hierarchy of the integrated circuit.

In one embodiment of the invention, a method of designing an integrated circuit is disclosed. The method includes receiving a netlist of a plurality of partitions of an integrated circuit design including a selected signal path for analysis; automatically generating timing budgets for the plurality of partitions of the integrated circuit design, including timing budgets for the selected signal path; computing timing delays along the selected signal path in response to the netlist; and generating, in substantial alignment, a first cumulative bar chart of the timing delays along the selected signal path and a second cumulative bar chart of the timing budgets for the selected signal path for comparison by a user.

In another embodiment of the invention, a method for integrated circuit design and analysis is disclosed. The method includes reading an automatically generated timing budgeting file including timing budget information for a plurality of partitions of an integrated circuit design; graphically displaying a time budgeting debug window on a display device, the time budgeting debug window including a first button with a path category menu to display one or more signal paths meeting a selected path category, and a path list window pane to display a list of one or more signal paths through one or more ports of the plurality of partitions in response to the selected path category in the path category menu; and graphically displaying a first timing budget analyzer window on the display device in response to selection of a first selected signal path in the path list window pane, the first timing budget analyzer window to graphically display timing budgets and timing delays of the first selected path for visual comparison.

In another embodiment of the invention, a circuit design is disclosed. The circuit design system includes a processor to execute instructions; a display device coupled to the processor, and a storage device coupled to the processor. The display device can graphically display graphical user interface windows to a user of the system. The storage device has instructions stored therein to that when executed cause the processor to be adapted to perform functions. The instructions stored in the storage device adapt the processor to read an automatically generated timing budgeting file including timing budget information for a plurality of partitions of an integrated circuit design; graphically display a time budgeting debug window on the display device, the time budgeting debug window including a first button with a path category menu to display one or more signal paths meeting a selected path category, and a path list window pane to display a list of one or more signal paths through one or more ports of the plurality of partitions in response to the selected path category in the path category menu; and graphically display a first timing budget analyzer window on the display device in response to selection of a first selected signal path in the path list window pane, the first timing budget analyzer window to graphically display timing budgets and timing delays of the first selected path for visual comparison.

In still another embodiment of the invention, a machine readable product for designing an integrated circuit is disclosed, The machine readable product comprises a machine readable storage device having stored therein machine readable instructions. The machine readable instructions, when executed by a machine such as a processor, function to receive a netlist of a plurality of partitions of an integrated circuit design including a selected signal path for analysis; to automatically generate timing budgets for the plurality of partitions of the integrated circuit design, including timing budgets for the selected signal path; to compute timing delays along the selected signal path in response to the netlist; and to generate, in substantial alignment, a first cumulative bar chart of the timing delays along the selected signal path and a second cumulative bar chart of the timing budgets for the selected signal path for comparison by a user.

Circuit Design System

FIG. 1 illustrates a block diagram of an exemplary circuit design system 100 for designing integrated circuits in accordance with an embodiment of the invention. As discussed in more detail below, the circuit design system 100 is capable of generating timing constraints for individual hierarchical blocks of an integrated circuit that are derived from the chip-level timing constraints and analysis. Using the chip-level timing constraints and analysis, the circuit design system 100 is capable of generating block-level timing constraints for module or block-level circuits as well as other constraints for time budgeting. The block-level timing constraints may be in the form of one or more logical timing constraint points associated with ports of a block-level circuit. The timing budgeting GUI can adjust the block-level timing budgeting data that may then be propagated to the timing budgeting data of other modules and blocks in the hierarchy of the integrated circuit so that when the blocks are finally assembled together to form the entire chip, timing closure for the entire chip can be achieved.

The circuit design system 100 may be configured as a computer system comprising one or more processors 102, an input/output interface 104, and one or more storage devices 106. The one or more processors 102 may be any type of data processing device, including microprocessors, microcontrollers, reduced instruction set computer (RISC) processors, networked computer systems, etc or a specialized processor for performing integrated circuit design. The one or more storage devices 106 may be any one or more computer readable mediums include memory devices 120, storage media 101 readable by a removeable media drive 140, and/or a hard disk drive 140 (e.g., RAM, ROM, magnetic hard disks, optical storage discs, etc.) for storing one or more software modules of instructions that control the processor 102 to perform its various operations. The one or more storages devices 106 may store information (e.g., circuit netlist, constraints, etc.) as well that the processor 102 uses in performing the circuit design process described herein. Such information may include the input circuit description specified by a user, the input circuit netlist generated by a logic synthesis operation, the chip-level physical and timing constraints, place and route data including chip-level timing analysis generated by a place and route operation, block definitions including block-level physical and timing constraints generated by a chip partitioning operation, block implementations generated by a block implementation operation, and the modified circuit specification generated by a chip assembly and top-level implementation operation, and verified by a circuit sign-off verification operation.

Under the control of instructions of one or more software modules stored in the one or more storage devices 106, the one or more processors 102 may perform the various operations of the circuit design system 100, including logic synthesis, chip-level floor planning, place and route, chip partitioning, block implementation, top-level implementation, chip assembly, and circuit sign-off verification.

The input/output interface 104 allows a user to send and receive information to and from the processor 102, as well as control the various operations performed by the processor 102. For example, the input/output interface 104 may comprise one or more input devices, such as a keyboard, a pointing device (e.g., a mouse, a track ball), a touch-sensitive display, microphone, etc. The input/output interface 104 may also comprise one or more output devices, such as a display (including a touch-sensitive display) driven by a graphics generator, speakers driven by an audio generator, etc.

Using the one or more input devices of the input/output interface 104, a user may specify an input circuit description in any of a number of formats, including in a hardware description language (HDL), such as VHDL or Verilog, or in a resistor-transistor logic (RTL) language. Using one or more output devices of the input/output interface 104, a user may view the results of the circuit design operation performed by the processor 102. The user may also control the circuit design operations performed by the processor 102 using the input/output interface 104.

The timing budgeting graphical user interface (GUI) 114 is displayed graphically in a graphics window on a display device (one of the input/output devices 104, e.g., liquid crystal display or cathode ray tube display) for viewing by a user and to interact with the user using other input devices (e.g., a mouse, with mouse buttons, and a graphical pointer generated by a graphics generator). Instructions stored in the one or more storage devices 106, when executed by the processor 102, generate the timing budgeting graphical user interface (GUI) 114 for one or more blocks/modules in response to one or more of the partitioning of the chip level netlist, chip-level design constraints (e.g., timing constraints, physical constraints, etc.), a timing library for the standard circuit cells in the IC design, timing models for macros/black boxes in the IC design, if any, a chip floorplan, and an initial placement data of cells and an initial route data of wire nets, if available.

Chip Hierarchy

Figure 7:
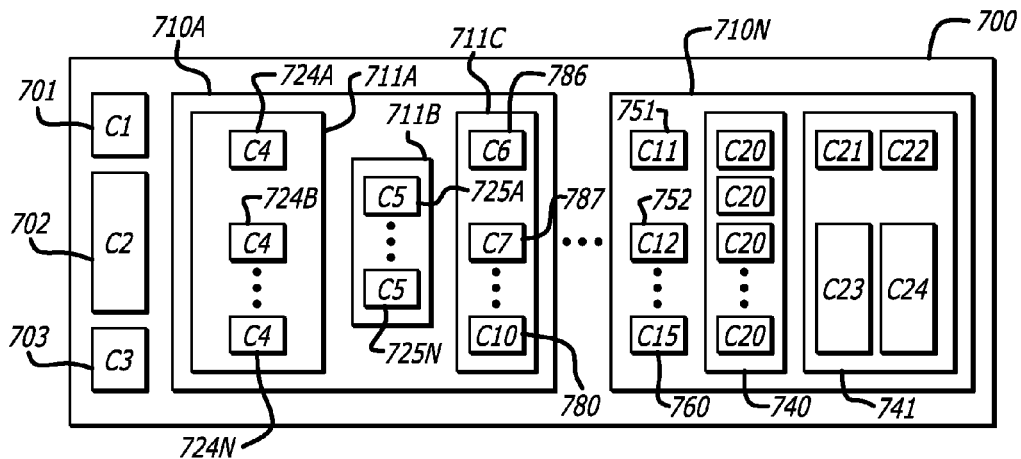
FIG. 7 illustrates a block diagram of an exemplary integrated circuit design depicting an exemplary hierarchy of instantiation.
Figure 8:
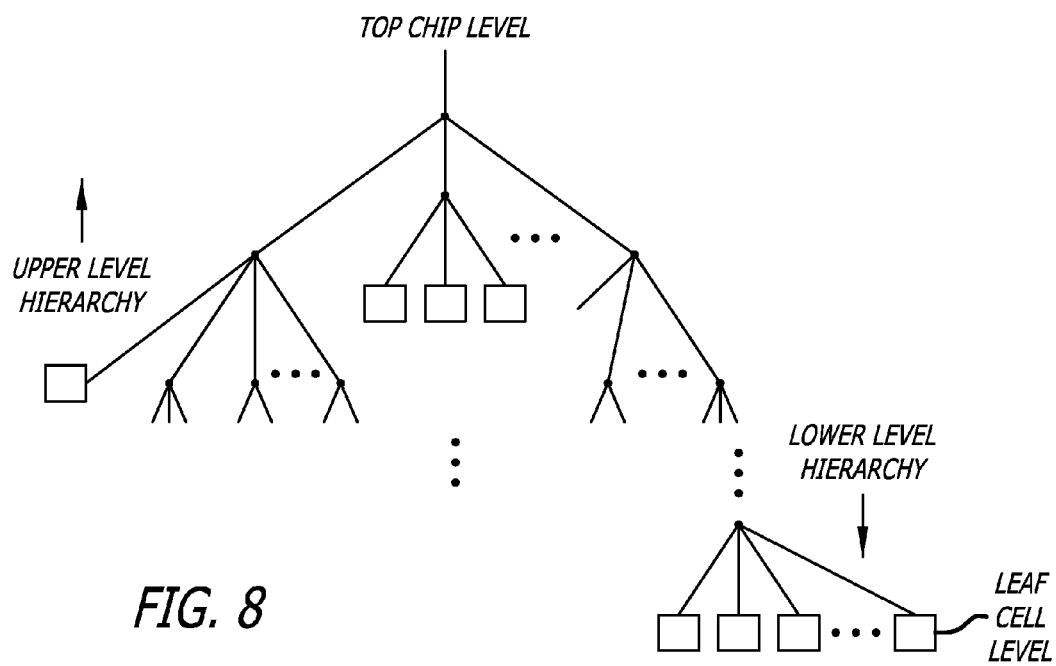
FIG. 8 illustrates an exemplary tree diagram of an integrated circuit design illustrating different levels of hierarchy.

Referring now to FIG. 7, the embodiments of the invention are used to design an integrated circuit, such as an exemplary integrated circuit 700. The integrated circuit 700 can be represented in a number of different ways. One representation of the integrated circuit 700 is by a hierarchical netlist with different levels of hierarchy including macro-blocks, modules or partitions (also referred to as upper-level blocks), blocks, sub-blocks, and leaf-cells or gates. The levels of hierarchy often include a top-level or chip level; one or more block-levels, and a cell or leaf level as illustrated in the exemplary hierarchy tree of FIG. 8. The cells at the leaf cell level of hierarchy may include transistors that may make up one or more logical gates.

At a top-level, the integrated circuit 700 may include one or more cells 701-703 and one or more upper-level blocks 710A-710N, for example. The upper level block 710A may include one or more lower level blocks 711A-711C. The upper level block 710N may include one or more cells 751-760 and one or more lower level blocks 740-741. The lower level blocks may include additional blocks or leaf cells. For example, blocks 711A-711C respectively include leaf cells 724A-724N; leaf cells 725A-725N, and leaf cells 726-730. In a block, the same leaf cell may be instantiated numerous times, such as a D flip flop to make up a register, for example. In block 711A, the same cell C4 is instantiated N times as leaf cells 724A-724N. In another block, different leaf cells may be instantiated depending upon the desired logical functionality.

Alternatively, the integrated circuit 700 may be represented by a flattened netlist of leaf-cells or gates without any added levels of hierarchy. Instead of a block level hierarchy, a flattened netlist may be used so that all design details of the integrated circuit are visible at the top level.

A flattened netlist of an integrated circuit 700 is typically used to perform chip-level timing analysis as entire data paths with their delay elements are more visible. However, timing closure by an EDA tool may be more difficult to obtain with a flattened netlist on an entire integrated circuit. Additionally, one computer system is typically used to perform a timing analysis on a flattened netlist as it is difficult to share the computational load of a flattened netlist with other networked computers. With a limited amount of computer resources, the time to perform a timing analysis of an entire integrated circuit chip may be quite long given today's complicated integrated circuits. In contrast with a hierarchical netlist of an integrated circuit, block-level timing analyses can be independently performed on a block by block basis using block level timing requirements. The block-level timing analyses, as well as timing budget analyses, can be shared amongst a plurality of networked computer systems so that it can be performed independently in parallel and achieve timing results and timing closure for the overall integrated circuit chip sooner.

Software Module System

FIG. 2 illustrates a block diagram of an exemplary software suite 200 used by the circuit design system 100 in performing its circuit design function. The software suite 200 includes a logic synthesis module 202, a chip-level floor planning module 204, a place and route module 206, a chip partitioning module 208, a block implementation module 210, a chip assembly and top-level implementation module 212, and a circuit sign-off verification module 214.

The logic synthesis module 202 generates a gate-level netlist from an input circuit description specified by a user using the input/output interface 104 (FIG. 1). The chip-level floorplanning module 204 generates an initial chip floorplan from the gate-level netlist.

The place and route module 206 generates an initial layout for the chip-level circuit using the initial chip floorplan and flat chip-level physical and timing constraints, which may be specified by a user using the input/output interface 104, and further generates flat chip-level timing constraints.

A timing budgeting module 209 generates timing budgets independent of the physical partitioning in response to a timing budget command. The timing budgeting module 209 may include a timing analysis (TA) module 207 that is called by the timing budgeting module to calculate delays along one or more selected signal paths of an integrated circuit design. The timing budgeting module 209 automatically generates initial time budgets and then analyzes and adjust the initial time budgets for the various levels of hierarchy and blocks in the integrated circuit design, prior to completion of the physical layout. Budgeting information can be saved with a budgeting command (deriveTimingBudget) without saving the physical portions of the IC design. While the IC design is being partitioned, in response to a savePartition command, timing budgets may be saved concurrently with the saving of the partitions generated after the physical partitioning module 208 of the IC design.

The chip partitioning module 208 partitions the initial chip layout into various hierarchical block-level circuits, and generates block-level physical and timing constraints.

The block implementation module 210 generates block implementations from the block definitions and block-level physical and timing constraints. The chip assembly module and top level implementation 212 assembles the block implementations, and may further optimize the assembled chip using chip-level constraints to generate a modified circuit design. The sign-off verification module 214 verifies that the modified circuit design performs to specification.

The chip partitioning module 208 can generate block-level timing constraints for each block-level circuit, that are derived from the flat chip-level timing constraints and analysis. The block-level timing constraints are in the form of logical timing constraint points (hereinafter referred to as "logical TC points") at the data input and/or output ports of each defined block-level circuit. Each logical TC point defines a clock source parameter for specifying a clock governing the propagation of data through a data path that passes through the block port, the delay parameter specifying a data propagation delay at the block port associated with a preceding or following block, and any applicable timing exceptions associated with the data path. Using the logical TC points, the block implementation module 210 performs timing analysis and/or optimization on the individual blocks to obtain implementations for the blocks. The derivation of the logical TC points from the chip-level timing constraints ensures that when the implemented blocks are subsequently assembled into the entire chip by the chip assembly and top level implementation module 210, timing closure for the entire chip can be achieved, and verified by the circuit sign-off verification module 212.

Timing Budget Analysis with a Timing Budget Graphical User Interface

The first step initially performed is to automatically derive timing budgets for each partition block. U.S. patent application Ser. No. 11/621,915, entitled SYSTEM AND METHOD OF GENERATING HIERARCHICAL BLOCK-LEVEL TIMING CONSTRAINTS FROM CHIP-LEVEL TIMING CONSTRAINTS filed by Levitsky et al. on Jan. 10, 2007, incorporated by reference, describes embodiments that generate block-level timing constraints for each block-level circuit that may be used to automatically generate the initial timing budgets for each of the partitions (e.g., functional modules or blocks) of an integrated circuit design as part of the timing budgeting process.

During the timing budget generation process, the timing budget analysis module 209 generates constraints (physical and timing constraints) for each partition, whether it is a module, a block, or other level of hierarchy in the integrated circuit design. An initial analysis is performed for each partition to determine their ports and check for false paths that may occur due to an improper assertion on the part. The false paths are saved in a first file (e.g., a warning file or .warn file) within a storage device that may be displayed in the timing budgeting GUI described further herein. An initial timing budget analysis is performed to trace selected paths to generate detailed information regarding the path and how the initial timing budget information was automatically assigned. The detailed information regarding the path is saved in a second file (e.g., a justify budgeting file or justifyBudget file) within the storage device. The detailed information may also be generated interactively. A timing budget analyzer window graphically displays some of the timing budgeting information contained in the second saved file (e.g., the justify budgeting file) to report it to the user.

After the initial timing budgets are derived and verified, data regarding the IC design (including the initial timing budget information that is desirous to view) is loaded into the timing budget GUI and presented to the user (typically an IC designer) on a display device. With the timing budget GUI, the IC designer is able to analyze the automatically generated budgets for each partition port, check timing reports, and adjust budgets if needed. Once the timing budgeting analysis process is completed, the final timing budgets are saved and the integrated circuit design is ready for a timing optimization process in the design flow process.

The timing budget graphical user interface (GUI) may include one or more windows of information that is graphically displayed to a user. Generally for one or more selected paths (which may be automatically selected by a path category), the timing budgeting GUI graphically displays timing delay calculations (e.g., slack calculations) with a color coded cumulative histogram of rectangles and lines next to hierarchy information and a color coded cumulative histogram of timing budget information allocated to the hierarchy of the integrated circuit design, so that a visual comparison may be readily made. If the graphical objects of the timing budgeting GUI indicate that the timing delays are over budget, the timing budgets may be adjusted and/or the integrated circuit redesigned so that the timing delays better meet the timing budgets.

Figure 3:
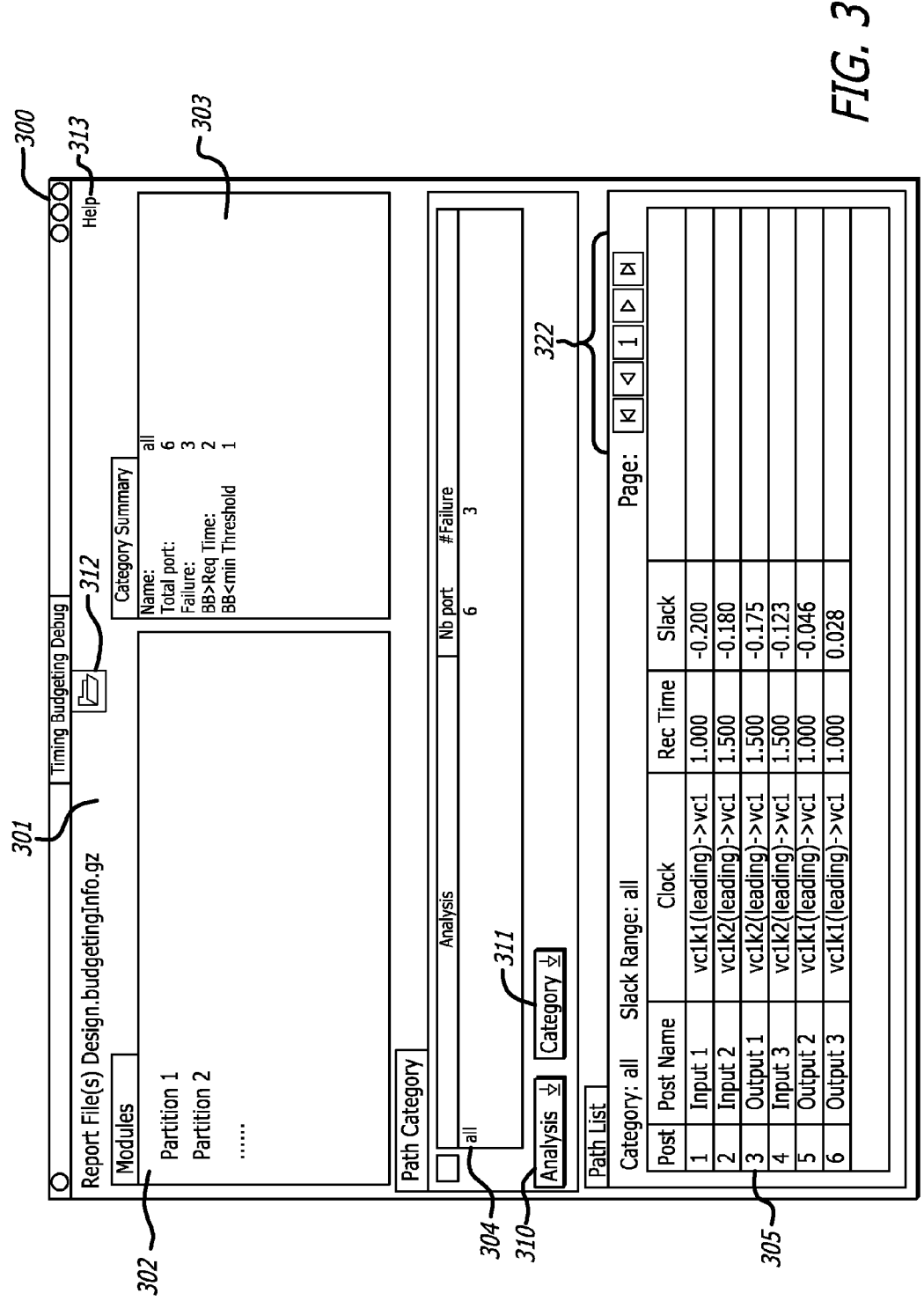
FIG. 3 illustrates an exemplary timing budgeting debug window that may be displayed on a display device to a user.

Referring now to FIG. 3, a first window of the timing budgeting GUI, a timing budgeting debug window 300, is illustrated that may be displayed on a display device to a user. The timing budgeting debug window 300 may include one or more window panes 301-305 including data fields to graphically present information to the user on a display device, and one or more buttons 310-313 with pop-up menus to make selections regarding the displayed information, and one or more buttons 322 to display further information.

As shown FIG. 3, an exemplary timing budgeting debug window 300 may include a report file pane 301 to show a report file (e.g., report file named Design.budgetingInfo.gz shown in FIG. 3) into which the timing budgeting information is to be stored for a given design. A file button 312 may be used to select other design files to perform timing budgeting debugging upon. A help button 313 may be used to offer guidance by bring forward a help menu with instructions for using the timing budgeting debugger.

A module window pane 302 is used to show the function modules, partitions, and/or blocks that may be selected to be analyzed under the top level of the integrated circuit design. The top level of the chip may be selected if all partitions are to be examined together. In the exemplary case shown in FIG. 3, a first functional module partition 1 (part 1 in FIG. 5) and a second functional module partition 2 (part 2 in FIG. 5) are at a top level are selected to be analyzed with the timing budgeting module. That is, a mouse may move a cursor into the module window pane 302 and select the top level of the chip or one or more partitions upon which work may be performed.

A category summary window pane 303 is used to summarize the analysis to be performed. In the exemplary case shown in FIG. 3, all categories of examination are selected, the total number of ports is six, number of failures is three, required time is two, and minimum threshold is 1. A path category window pane 304, displays the category name selected, the number of ports, and the number of failures. In the exemplary case shown in FIG. 3, all categories of examination are selected, the total number of ports is six, number of failures is three.

Below the path category window pane 304, are an analysis button 310 and a path category button 311 that may open into a menu list of times for selection, including one menu item to select all analyses and all categories. The path categories that may be selected include (i) one of the sections contained in the saved warning file (e.g., *.warn file); (ii) path with a slack less than zero (negative slack); (iii) a budget less than a predetermined threshold value; (iv) a selection of specific ports for analysis, for example all ports named "port*", or all inputs named "input*", etc.; (v) a selection of all paths from one clock domain to another; and (vi) a selection of all paths from partition A to partition B.

A path list window pane 305 is below the path category window pane 304 and the buttons 310-311. The path list window includes rows with data or information fields including a port number, a port name, clocking information, a required time, and a slack time for each path. Each row may further include a failure field. The rows may be sorted by the port number forming a column of port numbers that may be referred to as a port list. The port list is based on the category chosen. Each row or line in the port list corresponds to one path, in which case the same port number and name may be listed several times in the path list window pane 305.

The number of rows or paths may be so many that not all may shown in the path list window pane 305 concurrently. Instead, the number of rows or paths in the path list window pane 305 may be paginated with pages of a plurality or rows selected by the page buttons 322.

A user may select fewer than all paths to be displayed in the window pane 305 by choosing a range of slack times (slack range) or selecting fewer than all categories of analysis. With many paths to analyze, more than one user may be involved in performing the timing budget analysis. Accessing a unified data base, each user may work on different selected paths with different ports and different partitions. Upon completing the analysis, the updated timing budget information, if any, is stored together in the unified timing budgeting data base. The partitions should be independent so that there are no conflicts in merging the database.

Figure 4A:
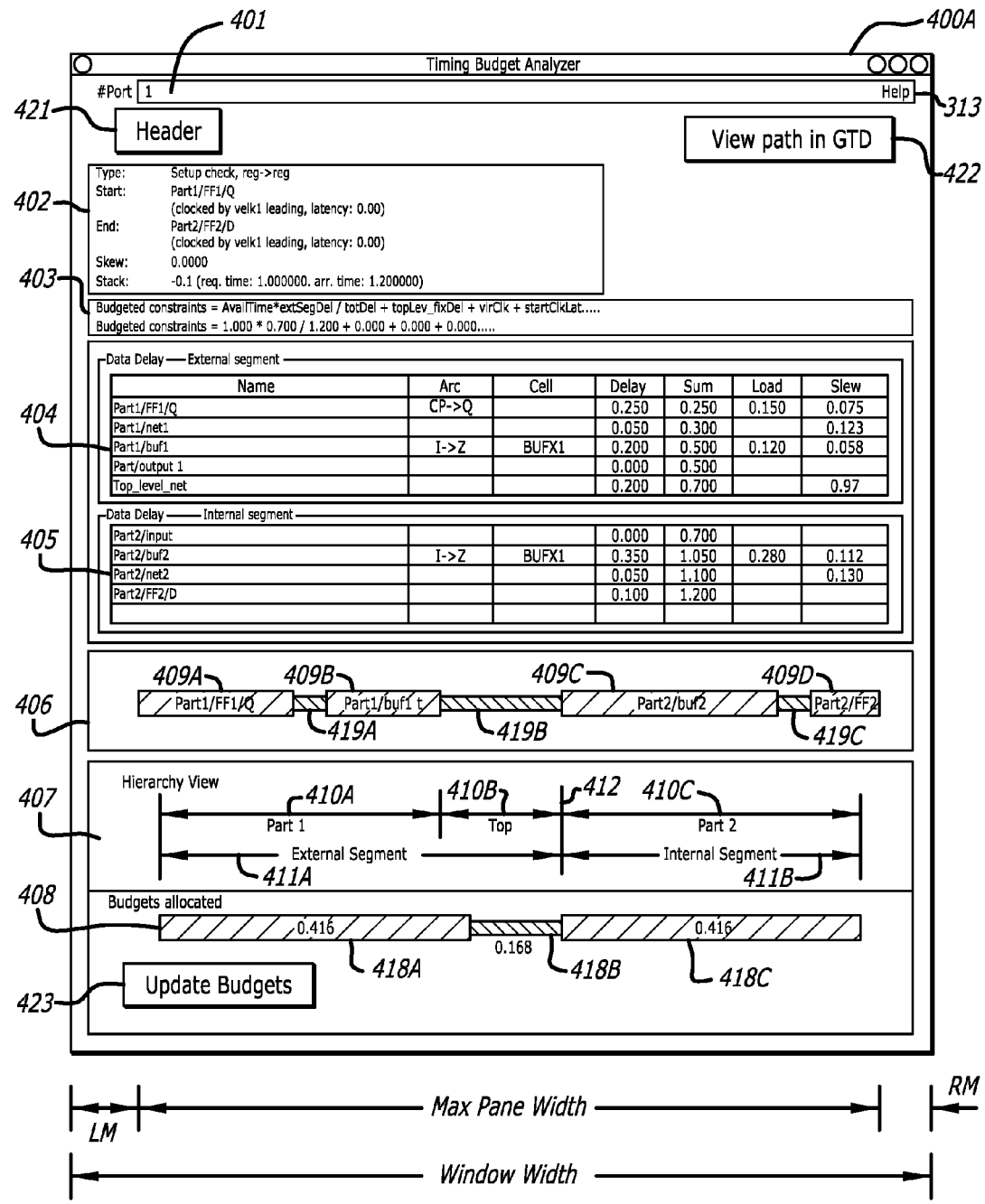
FIGS. 4A-4B illustrate exemplary timing budget analyzer windows that may be displayed on a display device to a user.

Referring now to FIG. 4A, a second window of the timing budgeting GUI, a timing budget analyzer window 400A is illustrated that may be displayed on a display device to the user. A timing budget analyzer window may be displayed for each port number. Each timing budget analyzer window may include one or more window panes 401-408 including data fields to graphically present information to the user on a display device, and one or more buttons 421-423 to make selections regarding the displayed information or display further information.

Figure 4B:
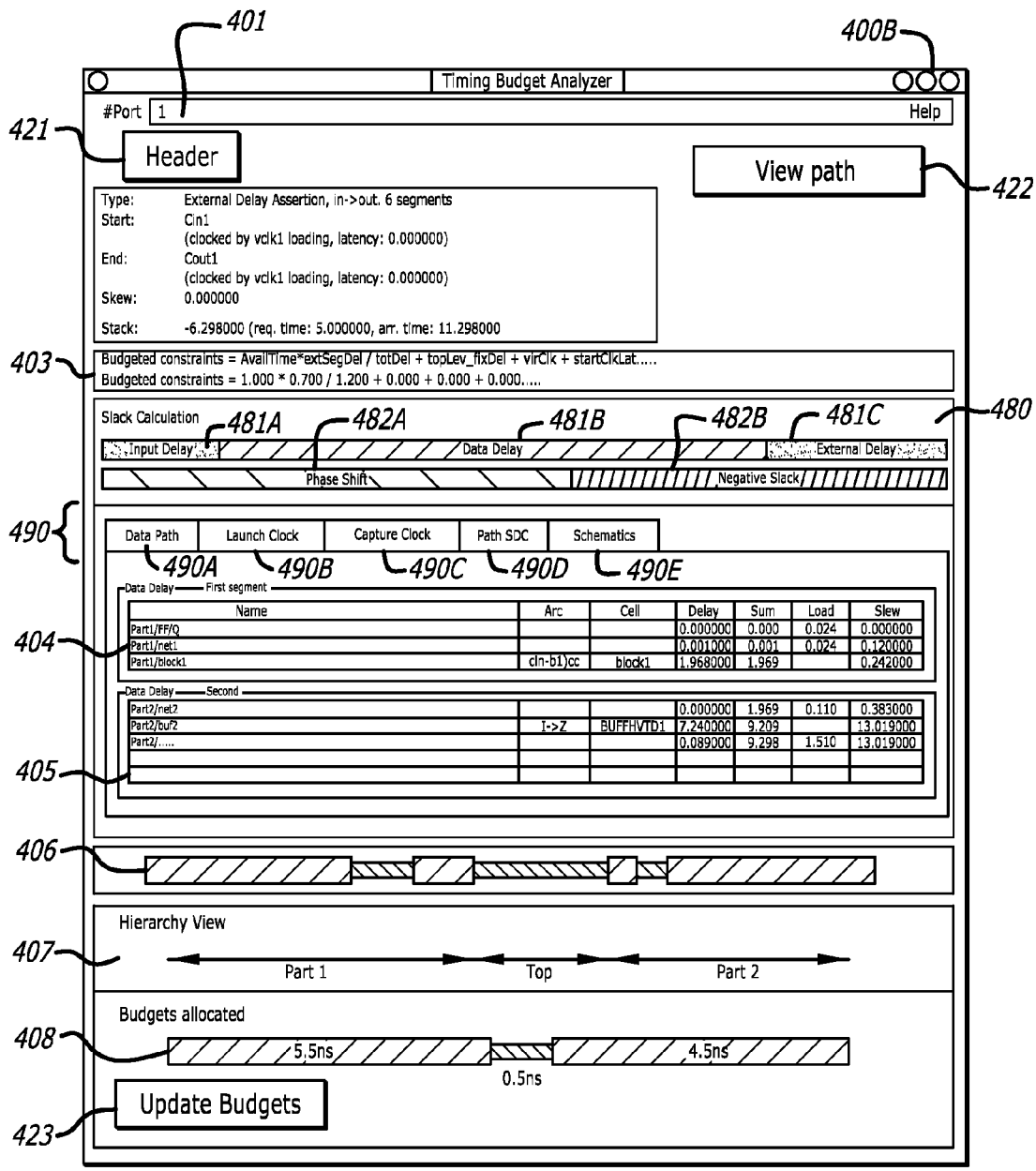

The exemplary timing budget analyzer window 400A shown in FIG. 4A is for port number one as indicated by the number 1 in the port number pane 401. Below the port number pane 401, is a header button 421 and a view path button 422 each of which when selected (e.g., clicked on by pressing a mouse button when the mouse cursor is over the button) opens a new window to display further information. The header button 421 opens header information regarding the chosen path displayed in the port number pane 401. The view path button 422 opens a new window to display a global timing debug (GTD) utility window. If a user wants to do detailed analysis of the path through the graphical timing debugger, he or she can do so by selecting the view path button 422. Referring momentarily to FIG. 4B, the global timing debug utility is a detailed tool that provides the functionality of the slack calculation window pane 480 and the tabs 490B-490E including a display of the schematic diagram of the selected path as well as other hierarchical information. For this reason, the timing budget analyzer window 400A is simpler than that of the timing budget analyzer window 400B.

Below the buttons 421-422 is a summary window pane 402. The summary window pane 402 includes information regarding the type of analysis being performed (e.g., setup check from register to register), start point, end point, clock skew if any, and the slack time computed given the required time and the arrival time. In the example shown in FIG. 4A, clock skew is 0.0000 nano-seconds (ns), and the computed slack time is a negative 0.2 ns given the required time of 1.000000 ns and a computed arrival time of 1.200000 ns.

Below the summary window pane 402 is a budgeted constraint calculation window pane 403. The budgeted constraint calculation window pane 403 illustrates a first equation with the variables used to compute the budgeted constraints. In a second equation in the budgeted constraint calculation window pane 403 below the first equation, values are substituted into the variables of the first equation so the budgeted constraint calculation can be made.

Below the budgeted constraint calculation window pane 403 is a detailed external segment data delay window pane 404 and a detailed internal segment data delay window pane 405. The detailed external segment data delay window pane 404 and the detailed internal segment data delay window pane 405 are described further herein with reference to the exemplary schematic diagram of FIG. 5. Generally, the detailed external segment data delay window pane 404 and the detailed internal segment data delay window pane 405 provide details of the timing delay calculations (e.g., the slack calculation) from the selected start point to the selected end point of the selected delay path in the netlist of the integrated circuit design. The delay path is separated into the internal segment and the external segments in response to the port number being analyzed and the selected start and end points. The separation makes it easier to determine if more of the timing delay of interest is attributed to the internal segment of the delay path or the external segment of the delay path. The external segment is the portion of a delay path that is outside of a partition that is being examined. The timing delay associated with each is referred to as the external segment delay and the internal segment delay, respectively. The internal segment is the portion of a delay path that is inside the partition that is being examined. If there is no external segment delay (e.g., top level chip pad being selected as the starting point), the detailed external segment data delay window pane 404 is empty.

Below the detailed external segment data delay window pane 404 and the detailed internal segment data delay window pane 405 is a path delay window pane 406 in the timing budget analyzer window 400A. The path delay window pane 406 may use a color coded cumulative histogram (which may also be referred to as a linear or cumulative bar chart with bars stacked upon each other) to graphically represent the timing delay along the selected path. The path delay window pane 406 including colored time delay rectangles 409A-409D to represent the time delay for various types of circuit cells of a cell library in the selected path and colored time delay lines 419A-419C for the interconnect delay stacked upon each other to represent the delay along the path. The interconnect delay is typically due to wires in the path. The colored time delay lines 419A-419C have a different color (e.g., yellow colored lines) than the colored time delay rectangles 409A-409D to further distinguish the time delay of the interconnect from the time delay of the circuit cells. The width of the time delay rectangles and the length of time delay lines indicates the approximate amount of time delay used by the respective circuit cells and wiring interconnect along the selected path through the given port number. The one or more time delay rectangles and the one or more time delay lines in the path delay window pane 406 may be referred to collectively as graphical time delay objects.

The color of the time delay rectangles may be different to distinguish between circuit cells or blocks. A first colored (e.g., red colored rectangle) rectangle may indicate a circuit cell in the path that can be altered or substituted with another circuit cell to change the time delay along the path. For example, there may different strengths of buffer circuits in a circuit cell library that have different time delays for a given load that can be substituted one for another. A second colored rectangle (e.g., purple colored rectangle) may indicate a circuit in the path that is fixed in delay and may not be altered or substituted with another circuit. For example, a custom circuit cell (e.g., a correlation cell) for which there is one design only that can be instantiated into a circuit without a substitute, may have a fixed delay and be represented by a second colored rectangle. In this manner, the timing budget analyzer window also graphically indicates how the selected path may be altered in order to better meet the timing budget.

Below the path delay window pane 406 is a path hierarchy window pane 407 in the timing budget analyzer window 400A. The path hierarchy window pane 407 includes a view of the levels of hierarchy (e.g., top level, partitions, modules, blocks, etc) in the integrated circuit design traversed by the selected delay path. The path hierarchy window pane 407 uses different doubled ended arrowheads 410A-410C and 411A-411B and the hierarchy level name in text located on or near each to graphically depict the levels of hierarchy. As a point of reference, the path hierarchy window pane 407 illustrates a break line 412 to illustrate the point defining a selected port (e.g., input port number 1) in the signal path under analysis. The ends of the doubled ended arrowheads 410A-410C and 411A-411B are substantially aligned with the start and end points of the path and time points where the path crosses from one level of hierarchy to another.

Figure 5:
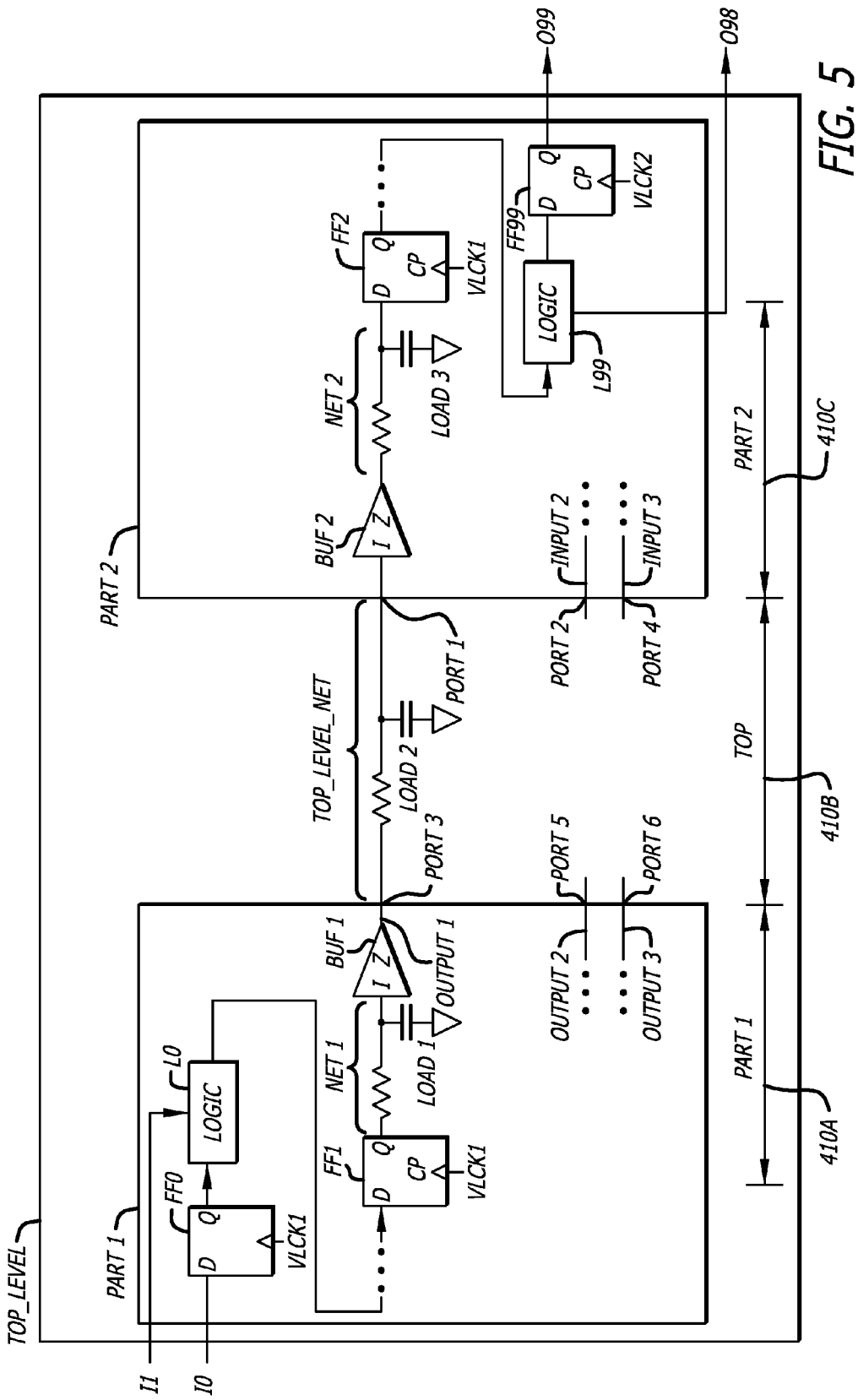
FIG. 5 illustrates a schematic and block diagram of an exemplary integrated circuit with a selected path being analyzed by the exemplary timing budget analyzer window of FIG. 4A.

FIG. 5 illustrates a block and schematic diagram of an exemplary integrated circuit design corresponding to the hierarchy shown in the exemplary timing budget analyzer window 400A. In example shown in FIG. 4A, the selected signal/data/control path in the integrated circuit starts in a first partition (Part 1) as indicated by the text near a first arrowhead 410A, traverses the top level of the chip (Top) as indicated by the text near a second arrowhead 410B, and then propagates in a second partition (Part 2) as indicated by the text near a third arrowhead 410C. With respect to the port number 1 as indicated by the break line 412, the path traversing the first partition and the top level of the chip is an external segment of the path as indicated by the text overlaid onto the double ended arrowhead 411A. With respect to the port number 1 as indicated by the break line 412, the path traversing the second partition is an internal segment of the path as indicated by the text overlaid onto the double ended arrowhead 411B in the window pane 407.

The hierarchical graphical objects (e.g., the arrowheads) displayed in the window pane 407 indicate where the cell circuits and interconnect contributing to the time delay of the selected path are located in the hierarchy of the integrated circuit design. For example, the arrowhead 410A indicating the first partition (Part 1) shows that the circuit cells represented the time delay rectangles 409A-409B and interconnect represented the time delay line 419A are located therein. Similarly, the arrowhead 410B indicating the top level (Top) shows that the interconnect represented by the time delay line 419B is located at the top level of the hierarchy of the integrated circuit.

Below the path hierarchy window pane 407 is a budget allocation window pane 408 in the timing budget analyzer window 400A. The budget allocation window pane 408 shows how the timing budget of the integrated circuit is allocated for the selected path through the selected port. The budget allocation window pane 408 may use a color coded cumulative histogram (which may also be referred to as a linear bar chart with bars stacked upon each other) with scaled lengths to graphically represent the timing budget along the selected path. The budget allocation window pane 408 includes colored time budget rectangles 418A, 418C (e.g., red colored rectangles) with a respective width (or length) to depict the allocated time budget for the various partitions in the integrated circuit and a colored time budget line 418B (which may be the same or a different color; e.g., a yellow colored line) with a respective length to graphically show the allocated time budget for the top level portion traversed by the selected path in the integrated circuit design.

The time budget rectangles 418A, 418C in the budget allocation window pane 408 correspond to the levels of hierarchy illustrated by the hierarchy arrowheads 410A,410C in the path hierarchy window pane 407. The colored time budget line 418B of the top level the budget allocation window pane 408 corresponds to the hierarchy arrowhead 410B representing the top level in the path hierarchy window pane 407. The time budget rectangles may take on a different color (e.g., green colored rectangles) to indicate partitions in the circuit design that are meeting the allocated timing budget (a predetermined threshold value assigned to the path segment in the partition) from those partitions that are not (e.g., red colored rectangles). The time budget lines (e.g., line 418B) in timing budget window pane may take on a different color (e.g., blue colored lines) to indicate interconnect wires in the circuit design that are meeting the allocated timing budget (a predetermined threshold value assigned to the path segment over the interconnect wires) from those interconnect wires that are not (e.g., yellow colored lines). Graphically displaying the different colors for being within budget and over budget in the budget allocation window pane 408 quickly informs the user where improvement may be needed in a visual manner.

The one or more time budget rectangles and the one or more time budget lines in the budget allocation window pane 408 may include a numerical value on or near each indicating the time budgeting value allocated to each traversed hierarchy in the path. For example, the time budget rectangles 418A, 418C in FIG. 4A each have 0.416 ns overlaid onto their rectangles to indicate the time budget allocated to the first partition and the second partition traversed by the path. The time budget line 418B has 0.168 ns located near it to indicate the time budget allocated to the top level interconnect in the selected path. The one or more time budget rectangles and the one or more time budget lines in the budget allocation window pane 408 may be referred to collectively as graphical time budget objects.

The graphical representations (e.g., cumulative bar charts) in the path delay window pane 406 (but for input net delays of a partition), the path hierarchy window pane 407, and the budget allocation window pane 408 of the timing budget analyzer window 400A may be automatically aligned substantially together at the break line 412 representing the input port number 1. Alternatively, they may be aligned substantially together from the start point of the path at the Q output of the flip flop FF1 or from the end point of the path at the D input of the flip flop FF2.

So that a proper comparison can be made between each, the lengths of the time budget lines and time delay lines and the widths of the time budget rectangles and time delay rectangles are similarly scaled with respect to time. How much time is scaled is responsive to a number of things. With reference to FIG. 4A, initially the scale factor is responsive to a maximum pane width (MPW) of the window panes 406 and 408. The maximum pane width (MPW) is determined by subtracting the size of a left margin (LM) and a right margin (RM) from the window width (WW) of the timing budget analyzer debug window. The total budgeted time (AvailTime) is compared with the total computed delay time (totDel) for the selected path. Whichever of these is larger sets the scale to use for scaling time into the length of graphical objects. The total budgeted time (AvailTime) along a signal path between flip flops may be equal to a clock period of the IC design plus or minus clock skew, if any. The equation for the scale factor is Scale factor=MPW/Max(AvailTime,totDel). In this manner, the larger of the two, total budgeted time (AvailTime) and total computed delay time (totDel) for the selected path, fills in the maximum pane width.

In comparing the budget allocation window pane 408 with the path delay window pane 406 for the selected path traversing the hierarchy through the given port, the user is graphically shown if the allocated timing budget is sufficient or not to that of the timing delays being computed. That is for the selected path, a user can compare the timing budget objects displayed in the budget allocation window pane 408 with the computed timing delay objects displayed in the path delay window pane 406 and the path hierarchy window pane 407 to determine if the computed timing delay is over budget or under budget.

For the example shown in FIG. 4A, a user may visually compare to overall cumulative lengths of the timing budget objects displayed in the budget allocation window pane 408 with the overall cumulative lengths of the computed timing delay objects displayed in the path delay window pane 406 and see that computed time delay for selected path is greater than the time budgeted. The user can further visually see the circuits, wire interconnect, and the hierarchy along the selected path where the time budget is not being met. Specifically with reference to the break line 412 representing input port number 1, the time budge line 418B for the top level interconnect is less than the computed time delay represented by the time delay line 419B and needs adjusting. Further, the time budget rectangle 418C for the second partition (Part 2) is shorter than the sum of lengths of the time delay rectangles 409C-409C and time delay line 419C indicating the second partition is not meeting the allocated time budget for it. The timing budget objects may also be color coded to visually indicate timing budgets being met and timing budgets being exceeded in the selected path as it traverses levels of hierarchy of the integrated circuit design.

After viewing the timing budget analyzer window, a user may adjust the time budget (e.g., increasing the time budget for one or more of the partitions and top level) for the selected path so that the calculated delays meet the allocated time budgets, but perhaps with a lowered level of performance or yield for the integrated circuit design. Alternatively, a user may redesign the circuits in the selected path (e.g., part2/ buf2) or improve the layout placement of the partitions in the floor plan of the integrated circuit (e.g., placing the partitions closer to reduce the top level time delay 419B) so that the computed timing delays better meet the allocated time budget.

If a comparison of the timing budget objects displayed in the budget allocation window pane 408 with the computed timing delay objects displayed in the path delay window pane 406 and the path hierarchy window pane 407 indicate that the computed timing delays for the selected path meet the allocated timing budgets, a user may check off that the timing delays for the selected path are met. Alternatively or conjunctively, the user may reduce the allocated timing budgets for the given path but still meet the allocated timing budget. The allocated budget may be moved to another partition that needs a greater timing budget or to the top level perhaps with further interconnect delay so that the partitions can be placed further apart providing greater flexibility in the floor plan of the integrated circuit. Instead, the user may redesign the circuits in the path substituting in slower circuits to better meet the allocated time budgets but perhaps reduce power consumption.

Below the budget allocation window pane 408 is an update budgets button 423 included in the timing budget analyzer window 400A that may be selected by a user using a mouse cursor or pointer and a mouse click. A user selects the update budgets button 423, if the user desires to update the budgets for the one or more partitions and or top level traversed by the selected path through the given port number. Selection of the updated budgets button 423 may open another window where the user can modify the automatically generated timing budget constraints or the existing timing budgets to updated timing budget information for the selected path. The new window displays the new budgets and all the ports affected by the updated timing budget. A save button may be used to save the updated timing budget constraints for future use in analyzing the selected path. In another embodiment, time budgets may be updated by dragging the rectangle to change its width and therefore the timing budget. If the updated budget effects other partitions, a new window may opened to show the time updates or the existing rectangles may be updated.

The timing budgets, when updated by a user, may be propagated throughout the integrated circuit design to other partitions through the use of a unified time budgeting data base. In this case, the integrated circuit design may be optimized to the allocated time budgets for each and every partition.

Referring now to FIG. 4B, an alternate timing budget analyzer window 400B is shown. The alternate timing budget analyzer window 400B includes many similar window panes and buttons as that of the timing budget analyzer window 400A shown in FIG. 4A, the description of which are incorporated here by reference. The alternate timing budget analyzer window 400B further includes a graphical slack calculation summary window pane 480 and one or more window pane tabs 490 positioned as shown in FIG. 4B.

The graphical slack calculation summary window pane 480 includes a first cumulative color coded bar chart (also referred to as the arrival time bar chart) having different colored bars with scaled lengths representing the arrival time calculation. The colored bars include input delay bar 481A, a data delay bar 481B, and an external delay bar 481C. As the data delay bar 481B is shown to be substantially the longest in the exemplary window 400B, it is the largest contributing factor to the slack calculation. The input delay is the time delay of the input signal at the start of the path that may be due to clock pulse to output delay in a flip flop for example. The data delay is the time delay due to interconnect and circuit cells in the path. The external delay may be due to external signal delays that may effect the timing along the selected path. Other factors that may be included in the arrival time bar chart is launch latency, and network insertion delays.

Under the first cumulative color coded bar chart, the graphical slack calculation summary window pane 480 further includes a second cumulative color coded bar chart (also referred to as the required time bar chart) having different colored bars with scaled lengths representing the required time in the selected path. The second cumulative color coded bar chart includes a phase shift bar 482A and a negative slack bar 482B with text overlaid upon each as shown. The second cumulative color coded bar chart may alternatively include a positive slack bar (not shown) of a different color coding instead of the negative slack bar 482B, if there is a positive slack in the selected path. Other factors represented by bars that may be included in the required time bar chart is capture latency, source insertion delay, path delay, cycle adjustment, and positive slack in the alternative to negative slack.

Color coding and certain types of bars in the bar charts may be used to indicate possible timing problems in the selected path. For example, an input delay bar in the arrival time bar chart, with a color blue for example, may be used to draw attention to a relatively large input delay time. A cycle adjustment bar may be use to draw attention in the required time bar chart to the presence of a multi-cycle path (e.g., clocked by different clocks). A path delay bar in the required time bar chart may be use to draw attention to the presence of a set_max_delay constraint, for example. A comparison of the arrival time bar chart with the required bar chart can also be made by the user to determine timing problems in the selected path. For example, a comparison of the lengths or alignment of a launch latency bar in the arrival time bar chart and a capture latency bar in the required time bar chart, if differences are large, may indicate a large clock latency mismatch in the selected path. The graphics provided by the color coded bar charts visually, at a glance, provide the general computed timing condition of the selected path. Generally this includes the identification of possible clock skew problems, latency balancing problems, and large clock uncertainties.

The one or more window pane tabs 490 display alternate window panes to that of the detailed external segment data delay window pane 404 and the detailed internal segment data delay window pane 405. The one or more window pane tabs 490 include a data path tab 490A, a launch clock tab 490B, a capture clock tab 490C, a path SDC tab 490D, and a schematics tab 490E. The user selects the desired tab with a cursor and a mouse click to display the desire information.

If the user selects the data path tab 490A, the detailed external segment data delay window pane 404 and the detailed internal segment data delay window pane 405 are displayed by the timing budget analyzer window 400B. If the user selects the launch clock tab 490B, an analysis of the clock that launches the signal down the selected path is displayed in a new window instead. The launch clock affects how quickly a signal is launched at the starting point of the selected path. If the user selects the capture clock tab 490C, an analysis of the clock that captures the signal at the end of the selected path is displayed in a new window instead. The capture clock effects how quickly a signal is captured at the end point of the selected path. If the user selects the path SDC tab 490D, design compiler statements (e.g., set_input_delay, create_clock, set_output_delay, set multicycle_path, etc.) that effect the selected path through the given port number are displayed in a new window instead.

If the user selects the schematics tab 490E, a new window may open to display the schematics of the hierarchy (e.g., levels, modules, blocks), circuits, and wire interconnect over which the signal path under analysis traverses. FIG. 5 illustrates an exemplary schematic and block diagram that may be displayed in a new window in response to the selection of the schematics tab 490F of window 400B and the view path button 422 of window 400A. The schematics/block diagram corresponds to the netlist and timing information displayed in the detailed external segment data delay window pane 404 and the detailed internal segment data delay window pane 405.

Referring now to FIGS. 5 and 4A, details of the timing budget analyzer window 400A are explained with reference to a block and schematic diagram of an exemplary integrated circuit design. The exemplary integrated circuit design has a hierarchy including a top hierarchical level Top_Level with a first partition Part1 and a second partition Part2 coupled together by one or more wire interconnects Top_Level_Net at the top hierarchical level. Each partition Part1,Part2 may have one or more input and output ports Port1-Port5. The selected path of interest couples the first partition Part1 to the second partition Part2 and may be one of one or more worst case delay paths in the integrated circuit design. For convenience, the double arrowheads 410A-410C indicating the hierarchy of the selected path under analysis is overlaid onto the schematic/block diagram of the exemplary circuit shown in FIG. 5.

As indicated by the summary window pane 402, for a setup check, the selected path interconnecting the partitions Part1 and Part2 starts at the Q output of flip flop FF1 in the first partition (Part1/FF1/Q) transverses a first internal interconnect network (Part1/net1) having a first parasitic load (Load1) and into an input I of a first buffer (Part1/buf1).

Parasitic loads may be shown schematically as a parasitic resistor coupled in series within the path and a parasitic capacitor load with terminals coupled between the selected path and ground. Without an indication of a parasitic load, a wire interconnect may be assumed to add no further delay or slew to the path.

For the timing arc from clock pulse (CP) to Q output of the flip flop, the flip flop contributes a time delay of 0.250 ns to the path as indicated in the delay and slew columns of the window pane 404 for the respective row. This incremental time delay along the selected path is depicted by the scaled timing delay rectangle 409A in the window pane 406. The output signal from the first flip flop has an output slew of 0.075 ns with an output capacitance load of 0.150 pico-farads (pf) in the path as indicated by the respective slew column and load column in the window pane 404 for the respective row.

The first parasitic load (Load1) due to the part/net1 wire interconnect contributes 0.050 ns of time delay to the path as shown in the delay column of the window pane 404 for the respective row. This time delay along the selected path is depicted by the scaled timing delay line 419A in the window pane 406. A signal on part/net1 wire interconnect has a slew of 0.123 ns as shown in the slew column of the window pane 404 for the respective row.

For the timing arc from the input I to the output Z of the first buffer and the given input slew rate of 0.123 ns, the first buffer contributes a time delay of 0.200 ns to the path timing as shown in the delay column of the window pane 404 for the respective row. That is, the timing delay of the first buffer is 0.200 ns in response to the input slew and the output load (0.12 pF) at the output Z. This incremental time delay along the selected path is depicted by the scaled timing delay rectangle 409B in the window pane 406. The output signal propagated from the first buffer has a slew of 0.058 ns as shown in the slew column of the window pane 404 for the respective row. The output of the first buffer has 0.120 pico-farads of capacitance load in the path as indicated by the load column in the window pane 404 for the respective row.

The Z output (output1) of the first buffer (Part1/buf1) is the third port (Port3) as indicated by the path list window pane 305 in FIG. 3. The I input (Part2/input1) of the second buffer (Part2/buf2) of the second partition is the first port (Port1) as indicated by the path list window pane 305 in FIG. 3. Additional outputs (output2, output3) of the first partition may respective be port5,port6 may coupled to additional inputs (input2,input3) of the first partition as port2,port4 but be in different signal paths than that selected and shown by the timing analyzer debug window 400A. Additional timing analyzer debug windows may be opened to analyze other paths between the first and second partitions.

Within the first partition (Part1), the first output (Part1/output1) is coupled into the top level wire interconnect (Top_level_net). The delay and slew columns of the window pane 404 for the respective row indicate that no delay or slew is added to the path by the first output (Part1/output1). Accordingly, there is no scaled timing delay rectangle or scaled time delay line for the first output (Part1/output1) in the window pane 406. The selected signal path then traverses through the top level wire interconnect (Top_level_net).

From the output (output1) of the first buffer (Part1/buf1) at the third port (Port3), the selected path further traverses the top level wire interconnect (Top_level_net) as indicated by the window pane 404 and shown in the schematic by a second parasitic load (Load2). The selected path for analysis is coupled into the second partition (Part2) at the first port (Port1) as a first input (Part2/input1). The top level wire interconnect (Top_level_net) contributes 0.200 ns of delay to the signal along the path as indicated in the delay column of the window pane 404 for the respective row. The time delay along the selected path contributed by the top level wire interconnect is depicted by the scaled timing delay line 419B in the window pane 406. The signal from the top level wire interconnect into the first port of the second partition (also referred to as the first input Part2/input1) has a slew of 0.97 ns as indicated in the slew column of the window pane 404 for the respective row. This slew of the signal on the top level wire interconnect can effect the timing of the logic gates to which it is input.

Within the second partition (Part2), the first input (Part2/input1) is coupled into the I input of the second buffer (Part2/buf2). The delay column of the window pane 405 for the respective row indicates that no delay is added to the path by the first input (Part2/input1). Accordingly, there is no scaled timing delay rectangle nor is there a scaled time delay line for the first input (Part2/input1) in the window pane 406. The slew column of the window pane 405 for the respective row indicates that the signal on the path does not have its slew rate altered from the slew of the top level wire interconnect. That is, continuing with the example, the signal propagates through with an unchanged slew of 0.97 ns to the input of the second buffer (Part2/buf2). The selected signal path then traverses through the second buffer (Part2/buf2).

For the timing arc from the input I to the output Z of the second buffer (Part2/buf2), the second buffer contributes 0.350 ns of delay to the path timing as shown in the delay column of the window pane 405 for the respective row. This incremental time delay along the selected path is depicted by the scaled timing delay rectangle 409C in the window pane 406. The lumped capacitance load (from the wire interconnect of part2/net2 and D input pin of part2/ff2/D) driven by second buffer is 0.280 pico-farads in the path as indicated by the load column in the window pane 405 for the respective row. The output Z of the second buffer (Part2/buf2) drives a signal further along the selected path onto a second wire interconnect (Part2/net2) within the second partition (Part2). The slew of the signal output from the output Z of the second buffer (Part2/buf2) is 0.112 ns as shown in the slew column of the window pane 405 for the respective row. This signal with this slew rate is coupled into the second wire interconnect (Part2/net2).

The signal path propagates over the second wire interconnect (Part2/net2) within the partition (Part2) to couple into a D input (Part2/FF2/D) of a second flip flop (FF2). The second wire interconnect (Part2/net2) contributes 0.050 ns of delay to the path timing as shown in the delay column of the window pane 405 for the respective row. This time delay along the selected path is depicted by the scaled timing delay line 419C in the window pane 406. An end of second wire interconnect is coupled into the D input of the second flip flop. A signal at the end of the second wire interconnect has a slew of 0.130 ns as shown in the slew column of the exemplary window pane 405 for the respective row.

The D input (Part2/FF2/D) of the second flip flop (FF2) has some time delay to register the signal before it can be stored with a clock pulse from the vclk1 clock signal. The D input (Part2/FF2/D) of the second flip flop (FF2) contributes 0.100 ns of delay to the path timing as shown in the delay column of the window pane 405 for the respective row. This incremental time delay along the selected path is depicted by the scaled timing delay rectangle 409D in the window pane 406. As this is the end of the path, there is no slew indicated for a signal output from the second flip flop (FF2).

The incremental time delays along the selected path depicted by the scaled timing delay rectangles 409A-409D and the scaled time delay lines 419A-419C in the window pane 406 sum to a total delay of 1.200000 ns, the arrival time of the signal along the path. The available time budget Avail-Time was 1.000000 ns such that the time delay exceeds the time budget. Thus with equal time scaling, a user viewing the timing budget analyzer window 400A can graphically see that the total cumulative length of the bar chart illustrated in window pane 406 is greater than the total cumulative length of the bar chart illustrated in window pane 408. That is, the user can visualize through the graphics provided in the timing budget analyzer window 400A that the time delay for the selected path is over the timing budget for the selected path.

Prior to the start of the selected path, there may be other flip flops FF0 and functional logic L0 in the first partition Part1 that coupled together and to other inputs I0, I1 to generate the signal that is coupled to the input D of the first flip flop FF1 and stored or registered in response to the first clock signal vclk1. After the end of the selected path, there still may be other functional logic L99 and flip flops FF99 in the second partition Part2 to receive the registered signal out from the output Q of the second flip flop FF2, further condition it, before storing it and generating other output signals O98, O99.

Figure 6A:
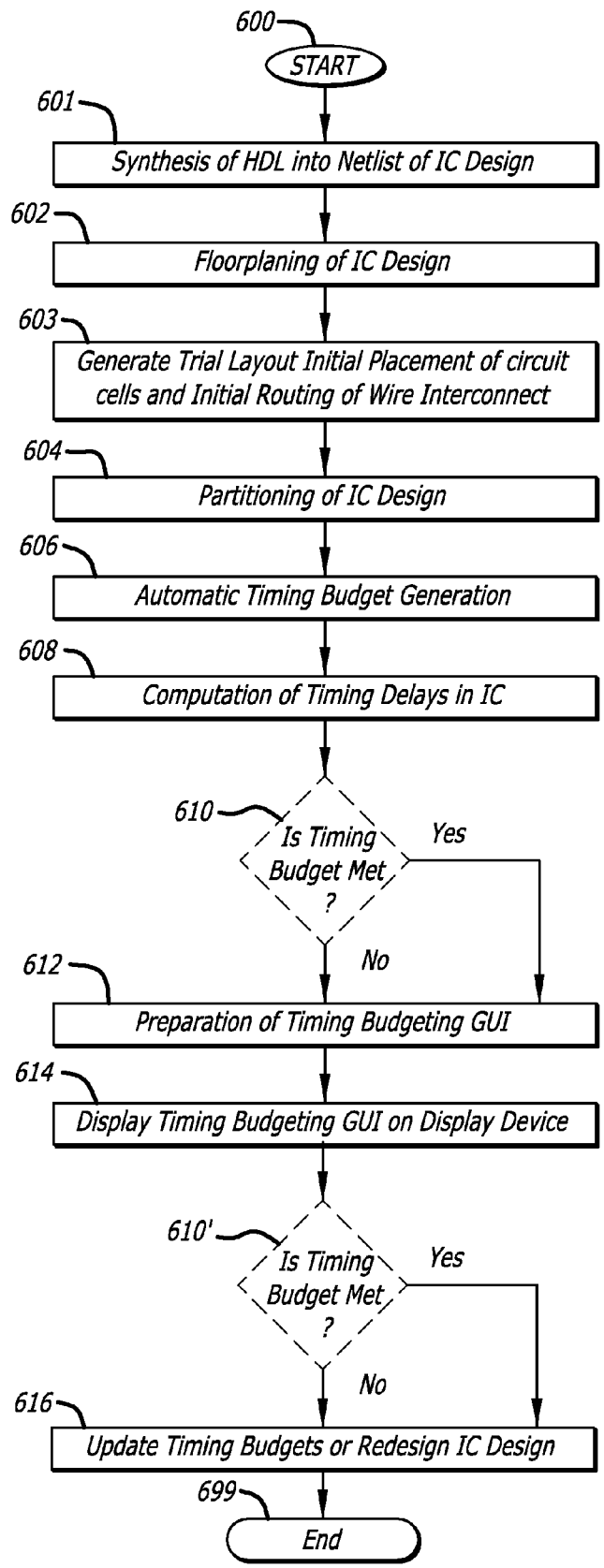
FIGS. 6A-6B illustrate flow charts of exemplary methods of performing timing budget analysis.

Referring now to FIG. 6A, a flow chart illustrates an exemplary process of integrated circuit design with timing budget analysis by means of a graphical user interface. The process starts at block 600 and then goes to block 601.

At block 601, a high level description of the integrated circuit (IC) design is logically synthesized into a netlist of the IC design. The process then goes to block 602.

At block 602, a floor plan for the layout of the integrated circuit design may be planned out. Major logical blocks of the IC design or partitions may be positioned in a floor plan of the layout based on certain constraints during the floorplanning process. The process then goes to block 603.

At block 603, an initial placement of circuit cells and an initial routing of wire interconnect is performed to generate a trial layout of the integrated circuit design. This is to better gauge timing delays due to wire interconnect in the signal paths of the IC design. The process then goes to block 604.

At block 604, to ease design and analysis, the integrated circuit design is partitioned into a plurality of partitions by partitioning up the netlist. The partitioning process is responsive to the floor plan and the initial placement of the circuit cells and initial the routing of wire interconnects of the trial layout. The process then goes to block 606.

At block 606, in response to the netlist now including a plurality of partitions of the integrated circuit design, timing budgets for the plurality of partitions of the integrated circuit design are automatically generated. The automatically generated timing budgets are saved to a file so that they can be read by the timing budgeting GUI. In response to a selection of path categories, the timing budgeting GUI may parse the timing budgeting file so that one or more selected paths can be visually analyzed. The process then goes to block 608.

At block 608, block implementation occurs where a user performs a block level timing and optimization for IC design. With the timing delays computed for each block/circuit cell along one or more desired signal paths that may be selected for timing budget analysis, a timing budgeting debug window of the timing budgeting GUI may be prepared and displayed. For the one or more selected signal paths, the timing delays contributed by each block are summed up along each selected signal paths entire length from a start point to an end point as it traverses one or more levels of hierarchy of the IC design, in response to the netlist. The process may then go to block 610 if an automatic comparison process is available. Otherwise, block 610 may be skipped, and blocks 612 and 614 are performed to prepare and display the time budgeting GUI.

If the software includes an automatic comparison process that automatically compares the time delay along the path with the initial time budgets, optional process 610 may occur before the processes 612 and 614 that prepare and display the timing budgeting GUI. Otherwise if the process is a manual one performed by a designer, a manual comparison process 610' occurs after the processes 612 and 614 prepare and display the timing budgeting GUI.

At block 610, a determination may be made by as to whether or not the timing budgets are being met along the one or more selected signal paths. If the timing budget is not being met along a signal path, this path may be flagged as failing. A failing path may warrant further timing budgeting analysis with a timing budget analysis window to determine where a path is not meeting the timing budget. The partitions and/or the circuit cells/blocks and wire interconnect may be color-coded for display to indicate the portions of a path that are over budget from those that meet the budget. The process then goes to block 612.

At block 612, further information for the timing budget analysis window of the timing budgeting GUI is prepared. The timing delays along the selected signal path and the timing budgets for the selected signal path are equally scaled so that they may be graphically displayed in the window panes of a graphical window. This equal scaling process sets the length of the graphical objects in a cumulative timing delay bar chart and a cumulative timing budgeting bar chart that are used to indicate timing delays of circuit cells and wire interconnect and timing budgets for a top level and one or more partitions. The graphical objects in the cumulative timing delay bar chart may be color coding to indicate cells and interconnect within each partition that are over a timing budget or under the timing budget. The graphical objects in the cumulative timing budgeting bar chart may also be color coded to indicate each partition that is over the timing budget or under the timing budget. Further preparation may be made and further information may be gleaned from the saved timing budgeting file so additional information may be displayed in the timing budgeting GUI such as that is shown in FIG. 3 and FIGS. 4A-4B. The process then goes to block 614.

At block 614, the timing budget analysis window for one or more selected signal paths is displayed on a display device. For a selected signal path, the cumulative timing delay bar chart of the timing delays along the selected signal path and the cumulative timing budgeting bar chart of the timing budgets for the selected signal path are displayed in substantial alignment for comparison by a user. The numeric values for the timing budgets of each of the plurality of partitions may be displayed on the objects or near the objects of the near the cumulative timing budgeting bar chart. A plurality of graphical objects placed in series in substantial alignment with the cumulative timing budgeting bar chart to indicate portions of the cumulative timing budgeting bar chart representing the path respectively within the plurality of the partitions. Other graphical objects may be displayed in the timing budgeting GUI such as that is shown in FIG. 3 and FIGS. 4A-4B. The process may then go to block 610' or block 616, skipping block 610' if the automated comparison is made.

At block 610', after the timing budget analysis window is displayed, a manual determination may be made as to whether or not the timing budgets are being met along the one or more selected signal paths. A user may manually compare the first cumulative bar chart with the second cumulative bar chart displayed in window panes 406, 408 respectively to determine if timing budgets are being met or not along the one or more selected signal paths. If the timing budget is not being met along a signal path, a user may elect to update a timing budget or redesign the IC in the next process. If the timing budget is being met along all signal paths, a user may elect to skip any updates to the timing budget and redesign of the IC design in the next process.

At block 616, if timing budgets are not being met (time delay is over timing budget), the timing budgets for the partitions of the IC design may be selectively updated. Alternatively, the netlist of the IC design may be updated so that the selected path under analysis will meet the timing budgets. The process may be repeated if the netlist of the IC design is updated or the budgets are updated. The timing budgeting GUI allows the timing budgets to be modified in order to perform "what-if" types of analysis. Otherwise the timing budgeting analysis process may go to block 699 and end.

Figure 6B:
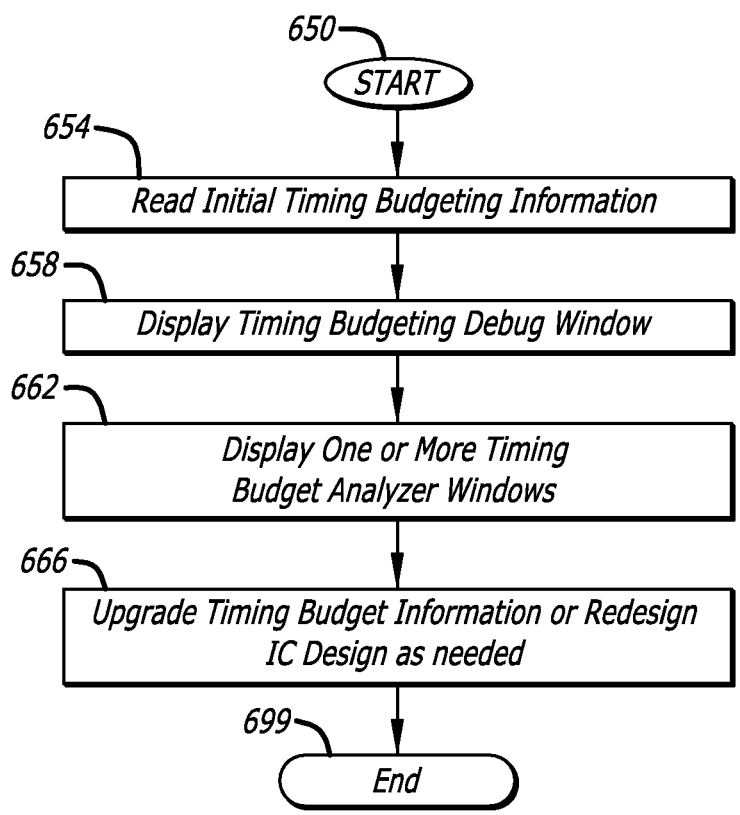

Referring now to FIG. 6B, a flow chart illustrates an exemplary process of displaying a timing budget analysis graphical user interface. The process starts at block 650 and then goes to block 654.

At block 654, initial timing budget information is read or received. The initial timing budget information may be automatically generated and saved into a timing budgeting file. The timing budget information includes the timing budgets the hierarchical levels of the IC design including the top level and a plurality of partitions that may be in the hierarchy under the top level of the IC design. The process then goes to block 658.

At block 658, a time budgeting debug window is graphically displayed on a display device. The time budgeting debug window includes a first button with a path category menu to display one or more signal paths meeting a selected path category, and a path list window pane to display a list of one or more signal paths through one or more ports of the plurality of partitions in response to the selected path category in the path category menu. The time budgeting debug window may further include a module window pane to display names of the plurality of partitions in the integrated circuit in response to reading the automatically generated timing budgeting file, and a second button with an analysis menu to select a type of analysis. Other graphic objects displayed that may or may not be selectable by the time budgeting debug window are shown in FIG. 3. The process then goes to block 662.

At block 662, one or more timing budget analyzer windows are graphically displayed on the display device. The one or more timing budget analyzer windows may be displayed in response to selection of selected signal paths in the path list window pane. The one or more timing budget analyzer windows graphically display timing budgets and timing delays of selected paths for visual comparison by a user.

The one or more timing budget analyzer windows may include a first cumulative bar chart to graphically display timing delays for each cell and interconnect within each level of the hierarchy traversed by the first selected signal path by a graphical object, and a second cumulative bar chart substantially aligned with the first cumulative bar chart. The second cumulative bar chart graphically displays timing budgets for each level of the hierarchy traversed by the first selected signal path by one or more graphical objects. The lengths of graphical objects in first cumulative bar chart and the second cumulative bar chart are for comparison by a user to determine each level of hierarchy traversed by the signal path in the integrated circuit design that is over the timing budget or under the timing budget. The one or more timing budget analyzer windows may further include a button to selectively update timing budgets for one or more levels of the hierarchy traversed by the first selected signal path.

The one or more timing budget analyzer windows may further include a summary window pane to display the type of analysis being performed upon the first selected path, start point of the first selected path, end point of the first selected path, clock skew, if any, of clocks clocking circuits in the first selected path, and slack time computed given the required time and the arrival time for the first selected path; a budgeted constraint calculation window pane to display equations and variables used to compute budgeted constraints; a detailed external segment data delay window pane and a detailed internal segment data delay window pane to display timing delay calculations from a start point to an end point of the first selected path; a path hierarchy window pane to display levels of hierarchy in the integrated circuit design traversed by the first selected path, graphical objects of the path hierarchy window pane substantially aligned with the graphical objects of the second cumulative bar chart.

Other graphic objects displayed that may or may not be selectable by the one or more time budgeting analyzer windows are shown in FIGS. 4A-4B. After displaying the one or more timing budget analyzer windows, the process then goes to block 666.

At block 666, if timing budgets are not being met (time delay is over timing budget) in one or more selected signal paths, the timing budgets for the partitions along the one or more selected signal paths of the IC design may be selectively updated as needed. That is, if timing delays in a partition are over the timing budget for the partition, the timing budget of the partition may be increased so that the timing delays along the respective selected signal path in the partition substantially meet an updated timing budget for the integrated circuit design. Each time budgeting analyzer window may display a selectable button to update the timing budgets for a respective path.

Alternatively, the netlist of the IC design may be updated as needed so that the one or more selected paths under analysis will meet the timing budgets. That is, if timing delays in a partition are under the timing budget, the timing budget of the first partition may be decreased so that the timing delays along the respective selected signal path in the partition substantially meets an updated timing budget for the integrated circuit design.

One or more of the blocks in the process may be repeated if the netlist of the IC design is updated or the budgets are updated. Otherwise, the process may go to block 699 and end.

CONCLUSION

Some portions of the preceding detailed description have been presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It may prove convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing", "computing", "calculating", "generating", "determining", "displaying", "planning", "synthesizing", "partitioning", "placing", "routing", "scaling", "color-coding", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The embodiments of the invention also relate to an apparatus for performing the operations and functions described herein. This apparatus may be specially constructed for the required purposes, or it may comprise a general-purpose computer selectively activated or reconfigured by a computer program stored in a storage device of the computer. When implemented as a computer program in software, the elements of the embodiments of the invention are essentially the code segments or instructions to perform the processes and functions. The algorithm processes may be written in a computer programming language and then converted to machine code segments, loaded into a computer, and then executed to perform the processes in an automated fashion. The program or code segments can be stored in a processor, computer, or machine readable medium such as a storage device. The code segments may also be downloaded via computer networks such as the Internet, Intranet, etc and stored in the processor, computer, or a storage device (e.g., a machine readable medium).

The processor, computer or machine readable medium may include any mechanism for storing or transmitting information in a form readable by a machine (e.g., a processor or computer). For example, machine-readable medium includes semiconductor storage media, magnetic disk storage media; optical storage media, or any type of media suitable for storing electronic instructions that may be coupled to a machine or a computer; such as, but not limited to, any type of disk including floppy disks, optical disks, CD-ROMs, magnetic-optical disks, read-only memories (ROMs), random access memories (RAMs), flash memory devices, EPROMs, EEPROMs, magnetic or optical cards. The computer program code may be transmitted via electrical, optical, acoustical or other form of propagated signals (e.g., carrier waves, infrared signals, digital signals, etc.) for storage into a computer or machine readable medium.

The processes presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will appear from the description herein. Additionally, the embodiments of the invention are not described with reference to any particular programming language. It will be appreciated that a variety of programming languages may be used to implement the teachings of the invention as described herein.

While certain exemplary embodiments have been described and shown in the accompanying drawings, it is to be understood that such embodiments are merely illustrative of and not restrictive on the broad invention, and that the embodiments of the invention not be limited to the specific constructions and arrangements shown and described, since various other modifications, variations, and adaptations may readily be understood after reading through the disclosure. Rather, the embodiments of the invention should be construed according to the claims that follow below.

What is claimed is:

1. A method for integrated circuit design and analysis, the method comprising:
    reading an automatically generated timing budgeting file including timing budget information for a plurality of partitions of an integrated circuit design;
    graphically displaying a first time budgeting debug window on a first display device, the first time budgeting debug window including
        a first button with a path category menu to display one or more signal paths meeting a selected path category, and
        a path list window pane to display a list of one or more signal paths through one or more ports of the plurality of partitions in response to the selected path category in the path category menu;
    graphically displaying a first timing budget analyzer window on the first display device in response to selection of a first selected signal path in the path list window pane, the first timing budget analyzer window to graphically display timing budgets and timing delays of the first selected path for visual comparison; and
    wherein one or more of the reading, the graphically displaying of the first time budgeting debug window, and the graphically displaying of the first timing budget analyzer window are performed with a processor.

2. The method of claim 1, wherein
the first time budgeting debug window further includes
    a module window pane to display names of the plurality of partitions in the integrated circuit in response to reading the automatically generated timing budgeting file, and
    a second button with an analysis menu to select a type of analysis.

3. The method of claim 1, wherein
the first timing budget analyzer window includes
    a first cumulative bar chart to graphically display timing delays for each cell and interconnect within each level of the hierarchy traversed by the first selected signal path by a graphical object,
    a second cumulative bar chart substantially aligned with the first cumulative bar chart, the second cumulative bar chart to graphically display timing budgets for each level of the hierarchy traversed by the first selected signal path by one or more graphical objects,
    wherein the lengths of graphical objects in first cumulative bar chart and the second cumulative bar chart are for comparison by a user to determine each level of hierarchy traversed by the signal path in the integrated circuit design that is over the timing budget or under the timing budget.

4. The method of claim 3, wherein
the levels of hierarchy traversed by the first selected signal path include a top level wire interconnect and the plurality of partitions.

5. The method of claim 3, wherein
the first timing budget analyzer window further includes
    a first button to selectively update timing budgets for one or more levels of the hierarchy traversed by the first selected signal path.

6. The method of claim 5, further comprising:
if timing delays in a first partition are over the timing budget for the first partition, increasing the timing budget of the first partition so that the timing delays along the first selected signal path in the first partition substantially meet an updated timing budget for the integrated circuit design.

7. The method of claim 5, further comprising:
if timing delays in a first partition are under the timing budget for the first partition, decreasing the timing budget of the first partition so that the timing delays along the first selected signal path in the first partition substantially meet an updated timing budget for the integrated circuit design.

8. The method of claim 3, wherein
the first timing budget analyzer window further includes
    a summary window pane to display the type of analysis being performed upon the first selected path, start point of the first selected path, end point of the first selected path, clock skew, if any, of clocks clocking circuits in the first selected path, and slack time computed given the required time and the arrival time for the first selected path;
    a budgeted constraint calculation window pane to display equations and variables used to compute budgeted constraints;
    a detailed external segment data delay window pane and a detailed internal segment data delay window pane to display timing delay calculations from a start point to an end point of the first selected path;
    a path hierarchy window pane to display levels of hierarchy in the integrated circuit design traversed by the first selected path, graphical objects of the path hierarchy window pane substantially aligned with the graphical objects of the second cumulative bar chart.

9. The method of claim 3, wherein
graphical objects of the first cumulative bar chart are color coded to indicate cells and interconnect within each partition that are over a timing budget or under the timing budget; and
graphical objects of the second cumulative bar chart are color coded to indicate each partition that is over the timing budget or under the timing budget for the respective partition.

10. The method of claim 1, further comprising
graphically displaying a second time budgeting debug window on a second display device, the second time budgeting debug window including
a first button with a path category menu to display one or more signal paths meeting a selected path category, and
a path list window pane to display a list of one or more signal paths through one or more ports of the plurality of partitions in response to the selected path category in the path category menu;
and
graphically displaying a second timing budget analyzer window on the second display device in response to selection of a second selected signal path in the path list window pane, the second timing budget analyzer window to graphically display timing budgets and timing delays of the second selected path for visual comparison.

11. The method of claim 1, wherein
the timing budgeting file further includes
timing budget information for the top level of the integrated circuit design.

12. The method of claim 1, wherein
for selection, the path category menu includes
one or more signal paths with a portion thereof in a warning file;
one or more signal paths with a slack less than zero;
one or more signal paths with a budget less than a predetermined threshold value;
one or more signal paths including a specific port or ports for analysis,
one or more signal paths having with a named input,
one or more signal paths from one clock domain to another clock domain; and
one or more signal paths from a first partition to a second partition.

13. A circuit design system comprising:
a first processor to execute instructions;
a first display device coupled to the first processor, the first display device to graphically display graphical user interface windows to a user;
a first storage device coupled to the first processor, the first storage device having instructions stored therein to adapt the first processor to:
read an automatically generated timing budgeting file including timing budget information for a plurality of partitions of an integrated circuit design;
graphically display a first time budgeting debug window on the first display device, the first time budgeting debug window including
a first button with a path category menu to display one or more signal paths meeting a selected path category, and
a path list window pane to display a list of one or more signal paths through one or more ports of the plurality of partitions in response to the selected path category in the path category menu;
and
graphically display a first timing budget analyzer window on the first display device in response to selection of a first selected signal path in the path list window pane, the first timing budget analyzer window to graphically display timing budgets and timing delays of the first selected path for visual comparison.

14. The circuit design system of claim 13, wherein
the first timing budget analyzer window includes
a first cumulative bar chart to graphically display timing delays for each cell and interconnect within each level of the hierarchy traversed by the first selected signal path by a graphical object,
a second cumulative bar chart substantially aligned with the first cumulative bar chart, the second cumulative bar chart to graphically display timing budgets for each level of the hierarchy traversed by the first selected signal path by one or more graphical objects,
wherein the lengths of graphical objects in first cumulative bar chart and the second cumulative bar chart are for comparison by a user to determine each level of hierarchy traversed by the signal path in the integrated circuit design that is over the timing budget or under the timing budget.

15. The circuit design system of claim 13, further comprising:
a second processor to execute instructions;
a second display device coupled to the first processor, the second display device to graphically display graphical user interface windows to a user;
a second storage device coupled to the second processor, the second storage device having instructions stored therein to adapt the second processor to:
read the automatically generated timing budgeting file including timing budget information for the plurality of partitions of an integrated circuit design;
graphically display a second time budgeting debug window on the second display device, the second time budgeting debug window including
a first button with a path category menu to display one or more signal paths meeting a selected path category, and
a path list window pane to display a list of one or more signal paths through one or more ports of the plurality of partitions in response to the selected path category in the path category menu;
and
graphically display a second timing budget analyzer window on the second display device in response to selection of a second selected signal path in the path list window pane, the second timing budget analyzer window to graphically display timing budgets and timing delays of the second selected path for visual comparison.

16. The circuit design system of claim 13, wherein
the timing budgeting file further includes
timing budget information for the top level of the integrated circuit design.

17. The circuit design system of claim 13, wherein
for selection, the path category menu includes
one or more signal paths with a portion thereof in a warning file;
one or more signal paths with a slack less than zero;
one or more signal paths with a budget less than a predetermined threshold value;
one or more signal paths including a specific port or ports for analysis,
one or more signal paths having with a named input, one or more signal paths from one clock domain to another clock domain; and one or more signal paths from a first partition to a second partition.

18. A machine readable product for designing an integrated circuit, the machine readable product comprising:
a machine readable storage device having stored therein machine readable instructions to
read an automatically generated timing budgeting file including timing budget information for a plurality of partitions of an integrated circuit design;
graphically display a first time budgeting debug window on a first display device, the first time budgeting debug window including
a first button with a path category menu to display one or more signal paths meeting a selected path category, and
a path list window pane to display a list of one or more signal paths through one or more ports of the plurality of partitions in response to the selected path category in the path category menu;
and
graphically display a first timing budget analyzer window on the first display device in response to selection of a first selected signal path in the path list window pane, the first timing budget analyzer window to graphically display timing budgets and timing delays of the first selected path for visual comparison.

19. The machine readable product of claim 18, wherein the first time budgeting debug window further includes
a module window pane to display names of the plurality of partitions in the integrated circuit in response to reading the automatically generated timing budgeting file, and
a second button with an analysis menu to select a type of analysis.

20. The machine readable product of claim 18, wherein the first timing budget analyzer window includes
a first cumulative bar chart to graphically display timing delays for each cell and interconnect within each level of the hierarchy traversed by the first selected signal path by a graphical object,
a second cumulative bar chart substantially aligned with the first cumulative bar chart, the second cumulative bar chart to graphically display timing budgets for each level of the hierarchy traversed by the first selected signal path by one or more graphical objects,
wherein the lengths of graphical objects in first cumulative bar chart and the second cumulative bar chart are for comparison by a user to determine each level of hierarchy traversed by the signal path in the integrated circuit design that is over the timing budget or under the timing budget.

21. The machine readable product of claim 20, wherein the levels of hierarchy traversed by the first selected signal path include a top level wire interconnect and the plurality of partitions.

22. The machine readable product of claim 20, wherein the first timing budget analyzer window further includes
a first button to selectively update timing budgets for one or more levels of the hierarchy traversed by the first selected signal path.

23. The machine readable product of claim 22, wherein the machine readable storage device further has stored therein machine readable instructions to
increase the timing budget of a first partition so that the timing delays along the first selected signal path in the first partition substantially meet an updated timing budget for the integrated circuit design, if timing delays in the first partition are over the timing budget for the first partition.

24. The machine readable product of claim 22, wherein the machine readable storage device further has stored therein machine readable instructions to
decrease the timing budget of a first partition so that the timing delays along the first selected signal path in the first partition substantially meet an updated timing budget for the integrated circuit design, if timing delays in the first partition are under the timing budget for the first partition.

25. The machine readable product of claim 20, wherein the first timing budget analyzer window further includes
a summary window pane to display the type of analysis being performed upon the first selected path, start point of the first selected path, end point of the first selected path, clock skew, if any, of clocks clocking circuits in the first selected path, and slack time computed given the required time and the arrival time for the first selected path;
a budgeted constraint calculation window pane to display equations and variables used to compute budgeted constraints;
a detailed external segment data delay window pane and a detailed internal segment data delay window pane to display timing delay calculations from a start point to an end point of the first selected path;
a path hierarchy window pane to display levels of hierarchy in the integrated circuit design traversed by the first selected path, graphical objects of the path hierarchy window pane substantially aligned with the graphical objects of the second cumulative bar chart.

26. The machine readable product of claim 20, wherein graphical objects of the first cumulative bar chart are color coded to indicate cells and interconnect within each partition that are over a timing budget or under the timing budget; and
graphical objects of the second cumulative bar chart are color coded to indicate each partition that is over the timing budget or under the timing budget for the respective partition.

27. The machine readable product of claim 18, wherein the machine readable storage device further has stored therein machine readable instructions to
graphically display a second time budgeting debug window on a second display device, the second time budgeting debug window including
a first button with a path category menu to display one or more signal paths meeting a selected path category, and
a path list window pane to display a list of one or more signal paths through one or more ports of the plurality of partitions in response to the selected path category in the path category menu;
and
graphically display a second timing budget analyzer window on the second display device in response to selection of a second selected signal path in the path list window pane, the second timing budget analyzer window to graphically display timing budgets and timing delays of the second selected path for visual comparison.

28. The machine readable product of claim 18, wherein the timing budgeting file further includes
timing budget information for the top level of the integrated circuit design.

29. The machine readable product of claim 18, wherein for selection, the path category menu includes
- one or more signal paths with a portion thereof in a warning file;
- one or more signal paths with a slack less than zero;
- one or more signal paths with a budget less than a predetermined threshold value;
- one or more signal paths including a specific port or ports for analysis,
- one or more signal paths having with a named input,
- one or more signal paths from one clock domain to another clock domain; and
- one or more signal paths from a first partition to a second partition.

\* \* \* \* \*